(12) United States Patent
Irving et al.

(10) Patent No.: US 11,244,331 B2
(45) Date of Patent: *Feb. 8, 2022

(54) SYSTEM AND METHOD FOR DOMAIN NAME COMMUNITY NETWORK

(71) Applicant: Go Daddy Operating Company, LLC, Scottsdale, AZ (US)

(72) Inventors: Blake Irving, San Luis Obispo, CA (US); Rene Reinsberg, San Francisco, CA (US); Tina Nguyen, Cupertino, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 207 days.

This patent is subject to a terminal disclaimer.

(21) Appl. No.: 16/579,317

(22) Filed: Sep. 23, 2019

(65) Prior Publication Data

US 2020/0019977 A1    Jan. 16, 2020

Related U.S. Application Data

(63) Continuation of application No. 15/060,378, filed on Mar. 3, 2016, now Pat. No. 10,423,972.

(Continued)

(51) Int. Cl.
*G06F 16/00* (2019.01)
*G06Q 30/02* (2012.01)
(Continued)

(52) U.S. Cl.
CPC ..... *G06Q 30/0203* (2013.01); *G06F 16/3322* (2019.01); *G06Q 10/0637* (2013.01); *G06Q 50/01* (2013.01); *G06Q 50/184* (2013.01); *G06T 11/206* (2013.01); *H04L 67/02* (2013.01); *H04L 67/10* (2013.01); *H04L 67/30* (2013.01); *H04L 61/1511* (2013.01)

(58) Field of Classification Search
CPC .............................. G06F 16/35; G06F 16/3322
See application file for complete search history.

(56) References Cited

U.S. PATENT DOCUMENTS

| 6,298,341 B1 * | 10/2001 | Mann ..................... G06F 16/955 |
| 7,177,947 B1 * | 2/2007 | Herzog ............. H04L 29/12066 707/999.007 |

(Continued)

*Primary Examiner* — Alexander Khong
(74) *Attorney, Agent, or Firm* — Greenberg Traurig, LLP

(57) ABSTRACT

Systems and methods of the present invention provide for one or more server computers communicatively coupled to a network and configured to run, within an active memory: a data collection module aggregating a plurality of domain name data; a profile generation module generating a domain name profile from the domain name data comprising attributes associated with a first domain name; a graph generation module defining domain names sharing attributes with the domain name, a second domain name in the domain names sharing a greatest number of attributes with the first domain name and closest, in proximity within a generated graph, to the first domain name; and a domain name strategy suggestion module rendering a user interface comprising a user interface control that identifies a referral to an administrator for the second domain name and provides, within the user interface control, a link for contacting the administrator.

19 Claims, 22 Drawing Sheets

Related U.S. Application Data

(60) Provisional application No. 62/127,686, filed on Mar. 3, 2015.

(51) Int. Cl.
*G06Q 50/00* (2012.01)
*G06Q 10/06* (2012.01)
*G06T 11/20* (2006.01)
*G06F 16/332* (2019.01)
*G06Q 50/18* (2012.01)
*H04L 29/08* (2006.01)
*H04L 29/12* (2006.01)

(56) References Cited

U.S. PATENT DOCUMENTS

| | | | | |
|---|---|---|---|---|
| 2002/0065903 | A1* | 5/2002 | Fellman | H04L 29/12594 |
| | | | | 709/220 |
| 2011/0016217 | A1* | 1/2011 | Simpson | H04L 12/6418 |
| | | | | 709/228 |
| 2012/0271877 | A1* | 10/2012 | Nicks | H04L 61/609 |
| | | | | 709/203 |
| 2015/0095176 | A1* | 4/2015 | Schilling | G06Q 30/0256 |
| | | | | 705/26.1 |
| 2015/0227581 | A1* | 8/2015 | Yacoub | G06Q 50/01 |
| | | | | 707/722 |
| 2016/0055490 | A1* | 2/2016 | Keren | G06Q 30/00 |
| | | | | 705/14.47 |
| 2016/0065597 | A1* | 3/2016 | Nguyen | H04L 63/1408 |
| | | | | 726/22 |
| 2016/0226819 | A1* | 8/2016 | Manadhata | H04L 61/1511 |

* cited by examiner

SMALL BUSINESS – COMMUNITY

FIND PEOPLE LIKE YOU

---

SIMILAR IDEA

After a review of your website, we thought you might be interested in the following websites and individuals with similar ideas.

i-love-bikes.com (Owner Chad Smith)
learn-to-ride-MTB.com
go-buy-a-bike.net (Owner Sam Smith – contact info)

---

SIMILAR MARKET

We've determined that you sell bicycle-related products in Phoenix, Arizona. Here are some businesses and websites that are in a similar space.

phoenix-bikes.com
arizona.ride
gnarly-trails.com

---

SIMILAR ONLINE PRESENCE

These businesses have setup similar products for their domain names as you (check out services, SEO, domain privacy). You may want to reach out to them to discuss the best ways to setup your products.

Idaho-pet-rescue.com (Owner Brad Jones – contact info)
spapumpsforless.com (Owner Brian Carlson – contact info)
furniture-for-less.home (Owner David Edwards – contact info)

---

SIMILAR HISTORY

Our records indicate that you are just getting started with your business. Congratulations! Here are some other companies that are also just getting started. Why not connect with their owners (links provided below) to discuss strategies!

phoenix-bikes.com (Owner Bill Smith – contact info)
arizona.ride (Owner Stewart Smith – contact info)
gnarly-trails.com (Owner Rodney Smith – contact info)

FIG. 5A

CONFIGURE SEARCH ENGINE OPTIMIZATION OPTIONS

NEED HELP?

Touch base with these other users who have just setup their own SEO options.

phoenix-bikes.com (Owner Bill Smith – contact info)
arizona.ride (Owner Stewart Smith – contact info)
gnarly-trails.com (Owner Rodney Smith – contact info)

WEB PROFESSIONAL

CLIENT FINDER

Our analysis indicates that the following domain name registrants are looking for help designing and setting up their websites.

We've also determined that these registrants intend to operate businesses that are similar to those for whom you've done work in the past. Also, we've tried to select registrant that are local to you – hopefully you'll be able to meet in person!

phoenix-bikes.com (Registrant Bill Smith – contact info)

arizona.ride (Registrant Stewart Smith – contact info)

gnarly-trails.com (Registrant Rodney Smith – contact info)

FIG. 8

FIND A WEB PROFESSIONAL

Our analysis indicates that the following web professionals are local to you and have experience working with similar companies. Please select one of the links below to reach out to the web professional and talk about how to get your web presence up and running!

killerdesigns.com (Registrant Sean Smith – contact info)

web-pros.arizona (Registrant Tim Smith – contact info)

arizona-presence.net (Registrant Rodney Smith – contact info)

FIG. 9

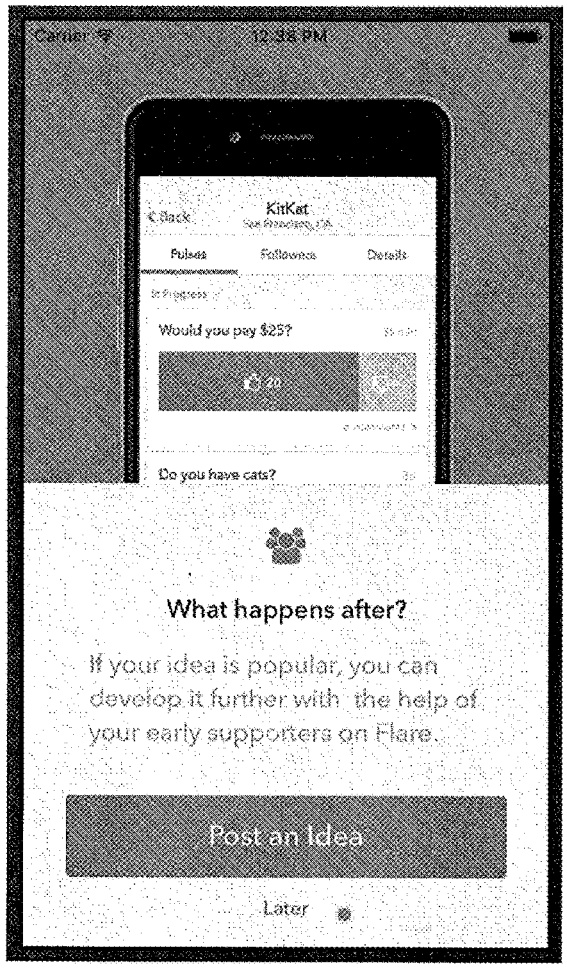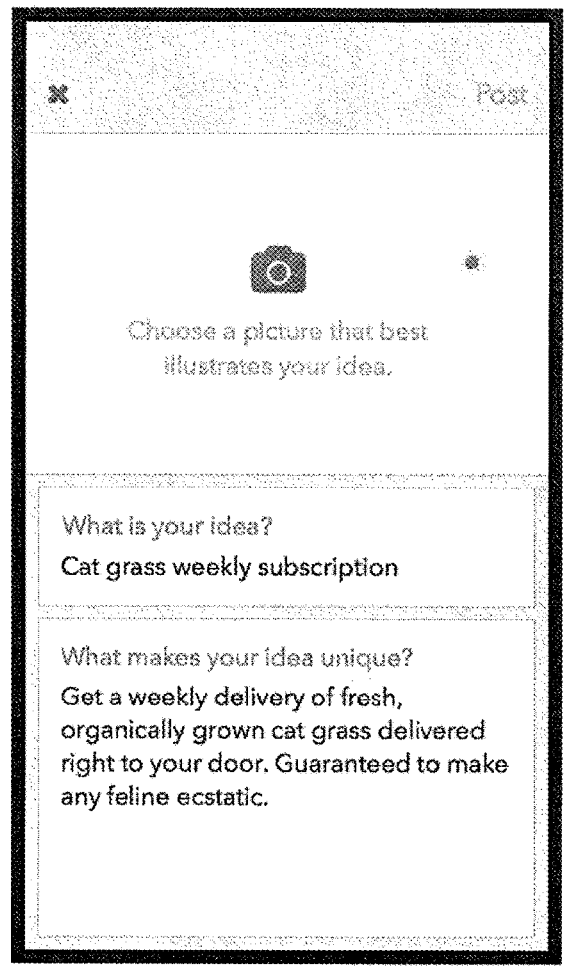
FIG. 10CFIG. 11

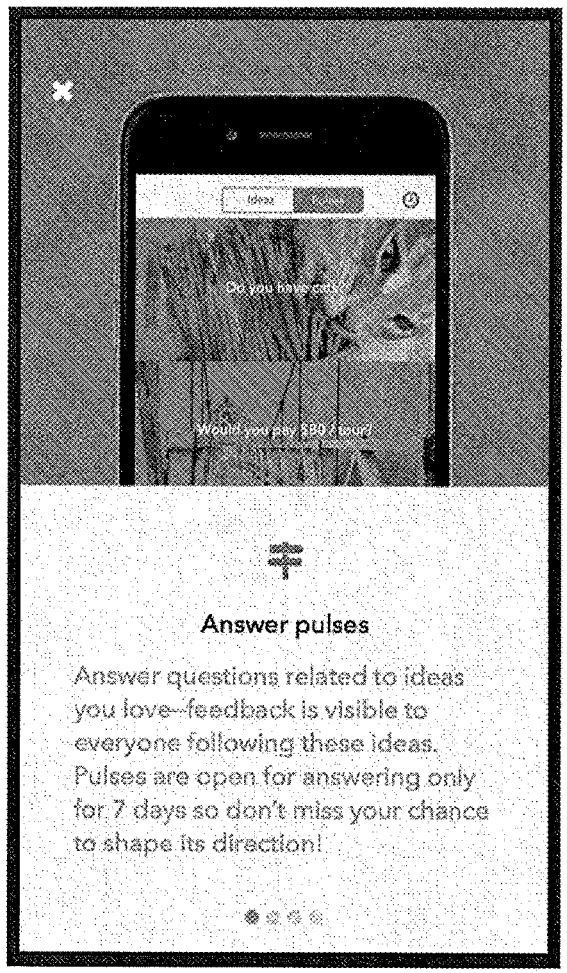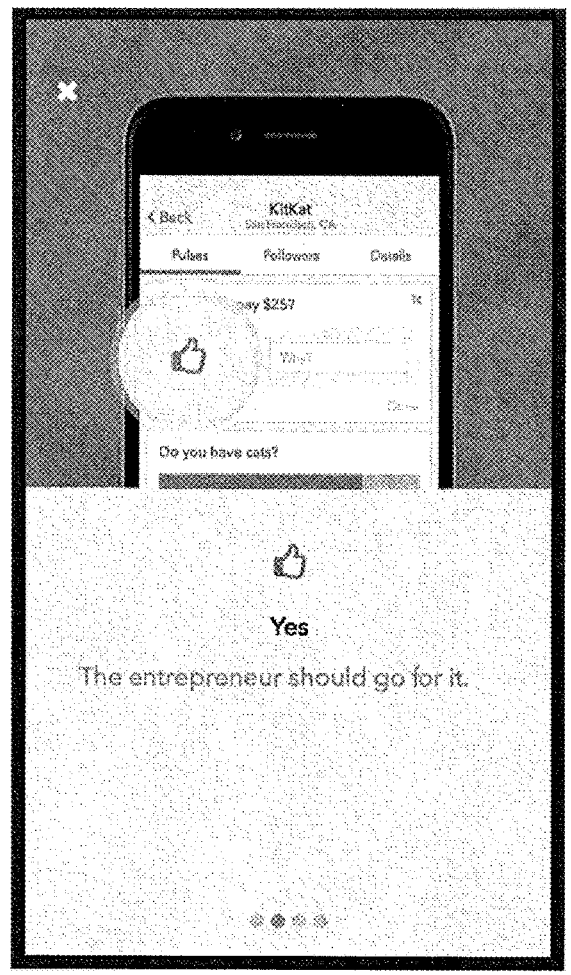
FIG. 17A                          FIG. 17B

SYSTEM AND METHOD FOR DOMAIN NAME COMMUNITY NETWORK

CROSS-REFERENCE TO RELATED APPLICATIONS

This application claims priority to U.S. Provisional Patent Application No. 62/127,686, filed Mar. 3, 2015, and entitled "SYSTEM AND METHOD FOR DOMAIN NAME COMMUNITY NETWORK."

FIELD OF THE INVENTION

The present invention generally relates to the fields of domain names and market research and specifically to the fields of generating social networks for domain name registrants and entrepreneurs seeking strategic advice regarding businesses associated with their domain names or product ideas.

SUMMARY OF THE INVENTION

The present invention provides systems and methods comprising a server computer coupled to a network and configured to run, within an active memory: a data collection module aggregating a plurality of domain name data; a profile generation module generating a domain name profile from the domain name data comprising attributes associated with a first domain name; a graph generation module defining domain names sharing attributes with the domain name, a second domain name in the domain names sharing a greatest number of attributes with the first domain name and closest, in proximity within a generated graph, to the first domain name; and a domain name strategy suggestion module rendering a user interface comprising a user interface control that identifies a referral to an administrator for the second domain name and provides, within the user interface control, a link for contacting the administrator.

The present invention also provides systems and methods comprising a server computer coupled to a network and configured to run, within an active memory of the server computer: a data collection query aggregating user profile data defining a user and product profile data defining products or services; a graph generation module defining a user feature common to a product feature, where a first product sharing a greatest number of features is closest to the user in the graph; a product suggestion module rendering a user interface comprising the first product, a positive response to the first product, and a negative response to the first product. If a positive response is received, the server computer renders the user interface with a second product closest in proximity to the first product, or if a negative response is received, re-generates the graph and renders the user interface comprising a second product in closest proximity to the user, but not sharing features with the first product.

BRIEF DESCRIPTION OF THE DRAWINGS

FIG. 5A is an example user interface used in a possible embodiment for business strategy and market research within a social network.

FIG. 8 is an example user interface used in a possible embodiment for business strategy and market research within a social network.

FIG. 9 is an example user interface used in a possible embodiment for business strategy and market research within a social network.

FIGS. 10A-10C are example user interfaces used in a possible embodiment for business strategy and market research within a social network.

FIG. 11 is an example user interface used in a possible embodiment for business strategy and market research within a social network.

FIGS. 17A-17D are example user interfaces used in a possible embodiment for business strategy and market research within a social network.

DETAILED DESCRIPTION

Figure 1:
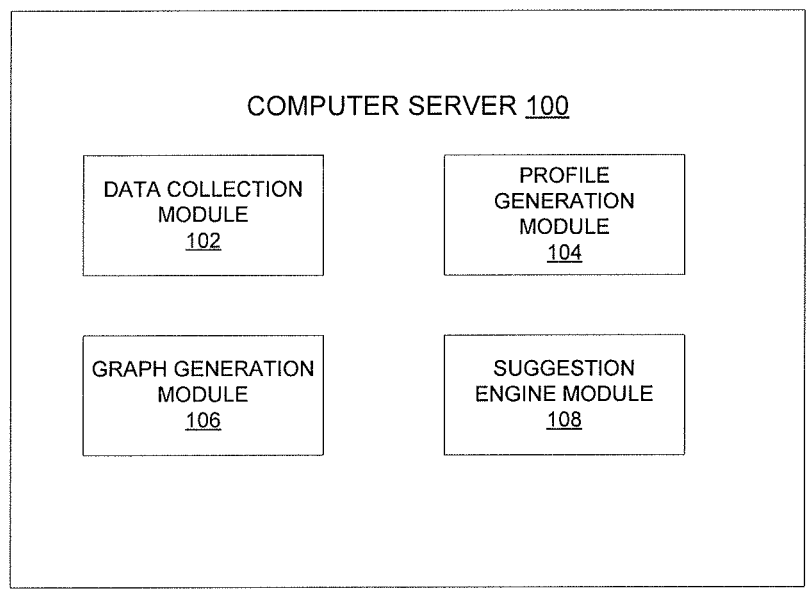
FIG. 1 illustrates a possible system for business strategy and market research within a social network.

Users of a social network may interact with other like-minded individuals (e.g., customers, suppliers, peers, consultants, etc.), perhaps to expand business opportunities and/or share strategies and ideas. The currently disclosed invention uses a collection of user profile data (e.g., GoDaddy's 59 million registered domain names) and related data to create a social network for individuals and entities, including those looking to start, grow or run an online venture. The network will be made up of a number of social graphs that identify related individuals, entities, businesses, concepts, etc. and the relationships between them. The disclosed invention also expands the concept of a social network beyond connections between people to include ideas as the fabric that connects people to other people through those ideas.

The disclosed invention, therefore, creates a social network between like-minded entities, where individuals, businesses, domain name registrants, website operators, market researchers, customers, suppliers, peers, consultants, investors, etc. share business strategies and ideas in order to expand business opportunities. To facilitate such a social network, the disclosed system may include a centralized repository of information storing a plurality of data associated with an online entity. In this disclosure, non-limiting examples of online entities may include a user of the disclosed system, an online business run by the user, a website associated with the online business, a domain name used to access the website, a product or service available through the online business and/or website, and/or one or more ideas for a new product or service to be offered by the business/website.

A user may input a request for information regarding these entities. For example, in some embodiments, the user may be an operator of an online business who has just registered one or more domain names for the user's business. In this example, the domain name(s) may be the user input for the disclosed system, and the domain names, as user input, may be used to request contact information for additional users in the social network that share characteristics with the new domain name registrant and/or the domain name. In other embodiments, the user input for the disclosed system may be made up of a user profile data about the user and/or an idea for a new product or service created by the user, and the input data may be used to request and identify related ideas for products or services within the social network that share characteristics with the user, the user's product or service idea, and/or products or services that the user has liked within the social network.

The disclosed system may generate a data profile for each of the identified entities, where the data profile is made up of a collection of data aggregated from multiple databases storing customer data records, accounting history data records for the customer's business, web server data for a business website, and/or domain name data associated with the customer's business website, as non-limiting examples. Thus, in embodiments where the user input includes one or more domain names, the domain name's data profile may be generated by aggregating customer data, business accounting history data, website data and/or domain name data associated with the input domain name. Similarly, in embodiments where the user input includes user profile data and/or a product or service associated with the user profile, the user or product's data profile may be generated by aggregating customer data, business accounting history data, website data and/or domain name data associated with the input user profile and/or product/service.

The disclosed system may generate a graph interrelating each of the identified entities. This graph may demonstrate the relationships between, and the relevance of, the identified entities, according to the entities' features, also referred to herein as dimensions. For example, in embodiments where domain name data profiles have been generated from customer, business, website and/or domain name data, the disclosed system may generate a graph where domain names that share greater number of features are clustered together in closer proximity, as compared to those domain names sharing a lesser number of these features. Similarly, in embodiments where user and/or product idea profiles have been generated, from customer, business, website and/or domain name data, for a user and/or product idea, the disclosed system may generate a graph where users and/or combinations of product ideas that share a greater number of features are clustered together in closer proximity than those users and/or product ideas sharing a lesser number of these features.

Using the generated graph, the disclosed system may generate suggestions for strategies to improve the user's business. For example, in embodiments where the generated graph comprises one or more domain names clustered in close proximity to the domain name(s) input by the user (and therefore sharing the greatest number of common features), the disclosed system may recommend, to the user that input the domain name(s): websites (e.g., URLs) or contact information (e.g., email or text number) for successful businesses in a similar industry or geography to determine important elements of success in their website design or business plan; websites or contact information for businesses having unrelated products or services, but that are similar in business growth (e.g., early stage businesses that have recently set up a shopping cart); websites or contact information for professionals to manage/expand the success of the business (e.g., technology, accounting, marketing or legal professionals); etc.

In embodiments where the generated graph comprises one or more product ideas clustered in close proximity to the user's profile, products submitted by the user, or products for which the user has input a positive response (and therefore sharing the greatest number of common dimensions), the disclosed system may recommend relevant products to the user via a user interface, thereby providing a social network that learns, from the user actions taken, similar market segments targeted marketing for specific products and types of products sharing similar features.

A first example embodiment of the disclosed invention may generate a social network connecting users who are seeking specific business feedback around recently registered domain names. To create the social network, data associated with each domain can be analyzed to learn as much as possible about the domain and its related registrant, website, business, venture, concepts, ideas, etc. This could involve analyzing the domain name itself, keywords in the domain name, traffic to the domain (including traffic volume, location of origination, and referrer information), search engine optimization (SEO) data for the domain, customer account information, website content at the domain, and the like. The analysis can then identify various data points for each domain and, thereby, concepts, ideas, business type, and/or business associated with the domain. Example data points include themes, terms, areas of interest, or business category, type, location, size, age, performance, target market, etc. However, the disclosed invention should not be limited to domain names only, but may be augmented to include any data aggregated by the data aggregation model, as disclosed herein, and the networks, graphs, relationships, etc. between this aggregated data.

These data points are then used to create the social network. The social network can then be used to provide useful leads or referrals to small business owners using GoDaddy's services or browsing its website. Referrals may be presented as a simple link to the websites of other related businesses or, for those business owners that opt-in, may include contact information for an individual or business. For example, a wedding planner in Phoenix, Ariz. may be referred to nearby flower shops and dress makers, perhaps those whose available data indicates experience in wedding floral arrangements and bridal gowns.

Sometimes the referrals may be to other businesses that sell similar products or provide similar services or to registrants that maintain websites of similar themes. For example, a Website Builder user constructing a new website for a bike shop could be presented with referrals to other bike shops around the country, perhaps those whose data indicates business success. This would allow the user to view the websites of the other bike shops and thereby learn what it takes to build a successful website. The user could also use the referrals to connect with other bike shop owners directly to see what they think are important elements in a bike shop's website, or perhaps even a business plan (e.g., what bike brands to carry, etc.).

In other cases, the referrals may be to businesses that sell unrelated products or services but that are similarly situated from a business growth perspective. For example, a new business in the process of adding shopping cart functionality to its website may be presented with referrals to other business that have only recently set up their shopping carts. This would allow the user to contact other business owners that are familiar with the shopping cart setup process. Thus, brand new businesses could be presented with referrals to other early-stage businesses to discover what has worked and not worked for them.

In yet another case, the social network may provide referrals to professional service providers (e.g., web designers, lawyers, accountants, tax professionals, marketing firms, etc. also in the network) that could help the business reach the next level of success. For example, if the available data indicates a business is nascent, a referral may be to an in-network (and perhaps local) web design and/or marketing firm that may be able to improve the business' website to improve traffic and sales. If the data indicates the business has a well-designed website and growing revenue, referrals may be to in-network (and perhaps local) accounting, tax, and/or legal firms that may help the business manage its newfound success.

This social network can also be used to enhance the experience of website professionals. Because the social network could identify new or nascent businesses, the network could be used to connect website and business developers with those new businesses. In that case, referrals could be made to new business owners identifying developers having a particular specialty associated with the new business. Alternatively, developers could be provided with referrals to new businesses that are in need of their services.

The social network also may be used to connect like-minded individuals with similar ideas, perhaps enabling them to help each other turn their ideas into reality. In one case, individuals (perhaps local to each other, or perhaps anywhere around the world) whose domain name-related data indicates interest in a common theme (e.g., bikes) may be referred or otherwise prompted to connect, engage, discuss, or otherwise interact around their common theme. The ability to connect such common-thinking individuals, based on the above-described data, is one unique aspect of this invention.

Another unique aspect of the disclosed invention, described in more detail below, includes use of the example data points to identify features that define users of the invention, including, but not limited to, a user's industry category, geographic location, and demographics of additional users that are associated with the user through a social network. The data points may also define features of products or services that the user has shown a particular interest in. These product features may include a title of the product, a description of the product, a stage of the entrepreneurial process that the creator of the product is in, a language spoken in association with the product, users within the social network that are following the progress of the product, the demographics of those followers, etc. The features defining the users and products may be used as factors in determining the types of products suggested to the user in the future, according to a relevance score calculated for the strength of connections between users and pairs of products or product ideas that share common features, as described below.

In one embodiment of the present invention suggesting business strategies based on relevant domain names, the above-described invention could be implemented with data collection, data analysis, and referral or suggested product generation software modules running on one or more server computers connected to the Internet.

The present system may be implemented by a computer server configured with a number of data processing modules, as described herein. The computer server may comprise any computer or program that provides services to other computers, programs, or users either in the same computer or over a computer network. As non-limiting examples, the computer server may comprise application, communication, mail, database, proxy, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client. To provide the present functionality, a computer server may implement a number of methods. Such methods may be performed by any central processing unit (CPU) in any computing system, such as a microprocessor running on at least one computer server and, optionally, a client computer system, and executing instructions stored (perhaps as scripts and/or software, possibly as software modules/components) in computer-readable media accessible to the CPU, such as a hard disk drive on the computer server.

FIG. 1 is a block diagram showing an example computer server configured in accordance with the present disclosure. Computer server 100 includes a number of data accumulation and processing modules that, when implemented together, provide the functionality of the present disclosure. As shown in FIG. 1, computer server 100 includes data collection module 102, profile generation module 104, graph generation module 106, and suggestion engine module 108. The modules may be stored in the memory of—and run on—at least one computer server 100. To run the modules on the at least one computer server 100, any of the modules, or any of the combination of the modules, may be accessed within the memory of the at least one server computer (e.g., the computer server's 100 hard drive) and loaded into active memory (e.g., the computer server's 100 random access memory), where the instructions for the modules may be executed. As non-limiting examples of such software, the present disclosure describes in detail the software modules/components that make up the software combination. These software modules/components may comprise software and/or scripts containing instructions that, when executed by a microprocessor on a computer server 100 or a client computer in communication with computer server 100, cause the microprocessor to accomplish the purpose of the module/ component as described in detail herein. The software combination may also share information, including data from data sources and/or variables used in various algorithms executed on the servers and/or clients 100 within the system, between each module/component of the software combination as needed. (note: remember to include something about software being loaded into active memory of computer server so it matches the claims . . . )

Data collection module 102 is generally configured to collect data associated with a number of domain names, a number of users and/or a number of products or other entrepreneurial ideas, as non-limiting examples. The data may be collected from a number of disparate data storage systems, where each data storage system stores information that is in some way associated with the domain name, the user and/or the product or idea for which data is being accumulated. To initiate data collection, data collection module 102 may be provided with a listing of domain names, users and/or ideas. Then, for each domain name, user and/or idea in the listing of domain names, users and/or ideas, data collection module 102 can access a number of data storage systems to collect information associated with the domain name, user and/or idea.

For example, a domain name system (DNS) may be accessed to retrieve a number of DNS records that are associated with the domain name. A customer account database, possibly maintained by a domain name registrar or registry, could be accessed to retrieve information from a customer account for the customer that has registered the domain name or that has submitted a product or other entrepreneurial idea to a community of such ideas. In that case, example data retrieved from the customer account database may include the name of the customer, the name and type of any business associated with the domain name, the idea or the customer, an indication of whether the business offers products or services, a size of the business, a targeted growth for the business, a date on which the customer account was created, a date on which the domain name was registered, identities of other domain names that are registered to the customer, demographic information about the customer, such as the geographic area of their home or an industry category with which their business is associated, details for any businesses, related business products or product ideas, websites, etc. related to the domain names, the results of any customer surveys regarding their domain name or business, a history of recent acquisitions of products or services for or associated with their domain name (e.g., domain name privacy services, website builder tools, templates or clipart for use with the domain name, security certificates, SEO services, and the like), search engine optimization (SEO) history for the domain name or a related website, ongoing or historical marketing efforts, geographical information, such as the location of the customer or anticipated location of customers, and the like.

If the customer account is associated with any bookkeeping or business accounting software or tools for a business associated with the domain name, data collection module 102 could access those systems to collect data related to the domain name or its associated business. For example, data collection module 102 could collect data such as a financial history of the company (historical sales numbers, trends in changes of sales), volume of products sold as well as the types of each of the products and/or ideas for new products, destinations to which products have been shipped, gross revenue, and the like.

In some cases, a website that is associated with the domain name could be accessed and analyzed by data collection module 102 to gather additional information associated with the domain name, the customer/user, the associated business, related products or ideas, etc. For example, the keywords on the website and/or associated with a user, business or product could be identified (along with keywords present in the domain name) and analyzed to determine a type of the website as well as a type of, or details about, a business, idea, theme, concept, or area of interest associated with the domain name or website, a target market for the website (this may include determination of both a target geographical area for the target market of the website—perhaps based upon language, and also a target age group for the website), an age of the website, a revision history of the website (e.g., how often the website has been changed or updated and by whom), the identification (if available) of any tools used to modify or update the website, and the like. In some embodiments, the traffic flow to the website can also be analyzed to identify, for example, the geographical regions from which a majority of the website's traffic originates, the language spoken by the majority of visitors to the website, and the like.

In the case of domain names associated with web development professionals, various databases may be accessed to identify a list of present and former clients of the web development professionals. This information can later be used to make recommendations of web development professionals to domain name registrants that are associated with nascent businesses and may need assistance in developing their web presence.

Figure 2:
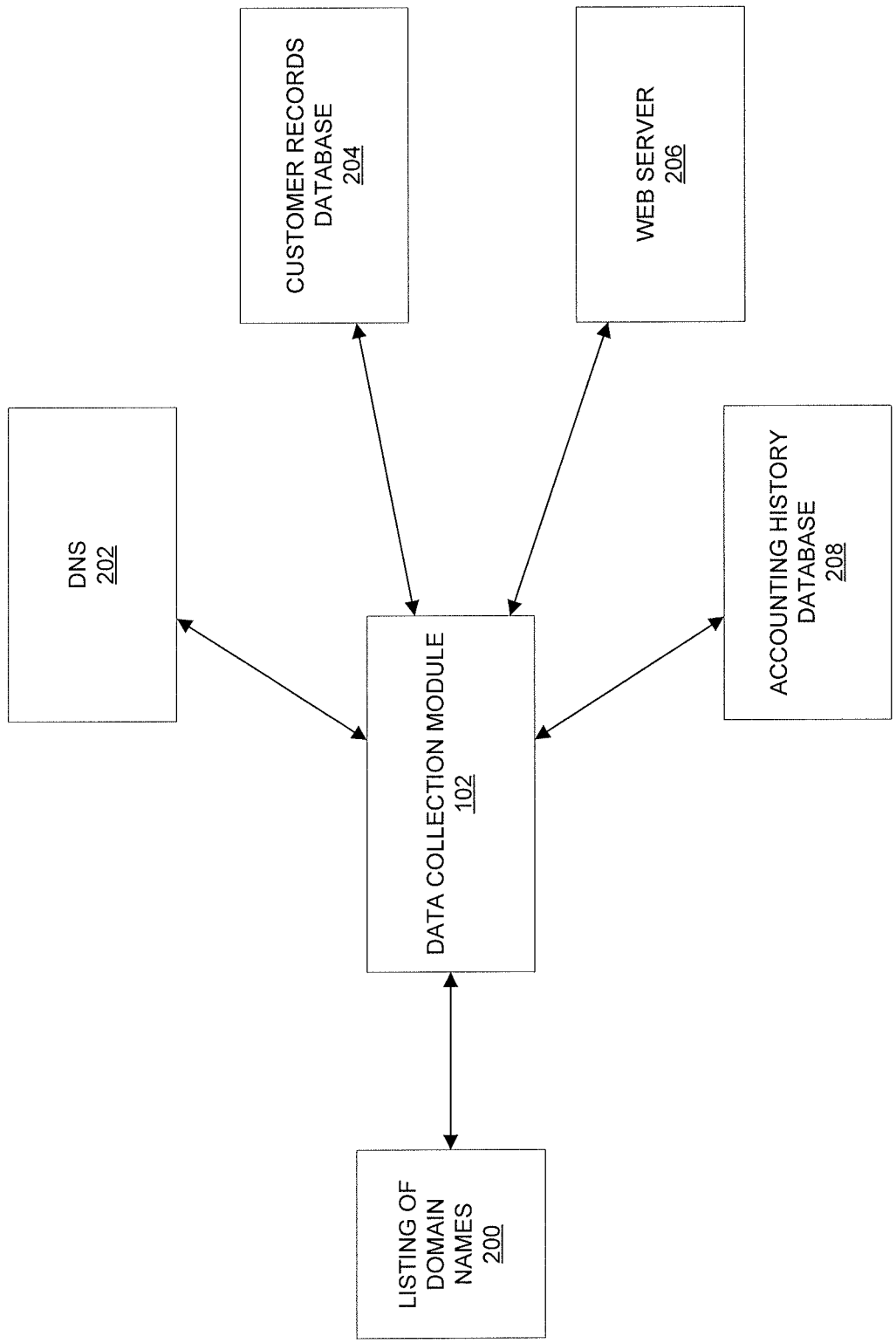
FIG. 2 illustrates a more detailed possible system for business strategy and market research within a social network.

FIG. 2 is a block diagram illustrating an example operation of data collection module 102. As shown in FIG. 2, data collection module 102 receives as an input a listing of domain names 200. Having received the listing of domain names 200, data collection module 102, for each domain name in listing 200, accesses a number of candidate data storage systems in an attempt to gather information related to the domain name. In some cases, a particular data storage system may contain no information related to a particular domain name. In that case, data collection module 102 would move on to the next data storage system in an attempt to gather at least some information about the domain name. In other cases, a data storage system may contain an incomplete or partial record of information associated with the domain name. In that case, data collection module 102 would collect the available information and then move on to the next data storage system. As illustrated in FIG. 2, data collection module 102 is configured in communication with a number of data storage systems including DNS 202, customer data records database 204, server 206, which hosts the website associated with the domain name, and accounting history database 208. The data storage systems shown in FIG. 2 are merely exemplary as it should be understood that data collection module 102 may be configured in various embodiments to communicate with any number of data storage systems to retrieve information related to a domain name.

As data collection module 102 accesses the various data storage systems to collect information and data associated with a domain name, that information and data can be stored in a suitable data repository to be accessed and retrieved by the other components of computer server 100.

After data collection module 102 has collected the available information for each of the domain names contained in the domain name listing, profile generation module 104 is configured to generate a profile for each of the domain names contained in the domain name listing. The profile is configured to describe various attribute of each of the domain names, which, in many cases, involves describing attributes of a business, theme, idea, concept, area of interest, or other entity that may be associated, in some way, with the domain names. The attributes may be referred to herein as dimensions. Depending upon the implementation of the present system, any number of dimensions may be defined or calculated for each of the domain names. In some cases, the information collected for a particular domain name may be insufficient to calculate a particular dimension for that domain name. In that case, the dimension for that domain name may be null or take on another default value.

Table 1, below, shows a listing of example dimensions that may be calculated by profile generation module 104 for each domain name in a set of domain names. The left column identifies the dimension, while the second column identifies, for each dimension, example data that may have been collected by data collection module 102 that may be utilized to calculate the dimension.

TABLE 1

| Dimension | Data Source |
| --- | --- |
| Age of domain name registration | DNS records<br>Customer account information stored with registrar of the domain name |
| Other domain name registrations | Customer account information |
| Business type | Customer account information<br>Website keywords<br>Accounting software history |
| Business size | Customer account information<br>Accounting software history |
| Business location | Customer account information |
| Business target growth % | Customer account information |
| Business actual growth % | Customer account information<br>Accounting software history |
| Target market geographical region | Customer account information<br>Website keyword analysis |
| Actual market geographical region | Customer account information<br>Website keyword analysis<br>Accounting software history |
| Domain name products purchased | Customer account information |
| Domain name products recently purchased | Customer account information |
| Age of website associated with domain name | Customer account information<br>DNS records<br>Website keyword analysis |
| Website keywords | Website and domain name keyword analysis |
| Website traffic volume | Website hosting analysis<br>Third party traffic volume analysis services |
| Ideas, concepts, themes, or areas of interest | Customer account information<br>Website and domain name keyword analysis |

The values of the various dimensions that may be defined for a domain name may be of varying types. For example, some dimensions may be numerical values, while others may be collections of keywords of text strings. Still other dimension values may include listings of values that describe particular geographical regions.

After the dimensions have been calculated for the domain names by the profile generation module 104, graph generation module 106 is configured to use the dimensions to generate a number of graphs that interrelate the various domain names on a number of different dimensions. In the present disclosure, a graph is a construct that can be used to depict or define the relationships between a number of entities. Generally, entities that are interrelated or connected in the graph share some similarity that unconnected entities do not (or connected entities are more strongly related than unconnected entities). In the present disclosure, a number of different graphs could be generated for each one of the various domain names, where each graph focuses upon a different dimension or combination of dimensions.

Figure 3:
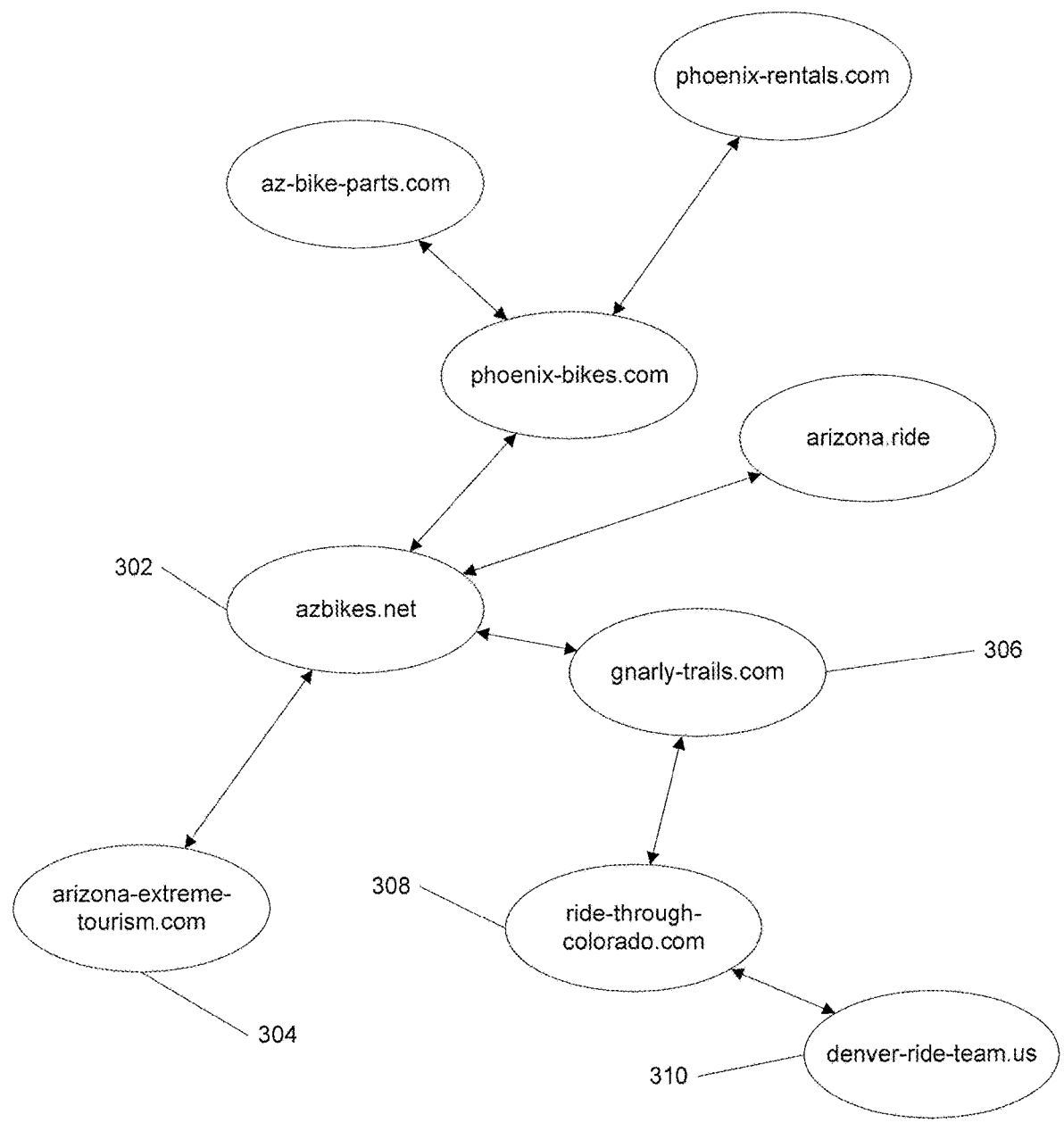
FIG. 3 is an example graph used in a possible embodiment for business strategy and market research within a social network.

FIG. 3 shows an example graph that depicts the relationship between a number of domain names, where the domain names are grouped based upon location and website keywords. Centered in the graph is domain name azbikes.net 302, a domain name for a business based in Phoenix, Ariz. In this example, the domain name is associated with a website upon which bikes are sold. As can be seen, domain name 302 is directly connected to a number of other domain names that are, themselves, associated with websites that contain similar keywords to the website for domain name 302 and that are also located in a similar area.

Domain name arizona-extreme-tourism.com 304 is related to domain name 302 through an intermediary domain name. This relationship could be created, for example, because the website associated with domain name 304 includes some keywords that relate to biking—perhaps it is one of the tourist activities offered on the website. Additionally, because the geographical region associated with domain name 304 includes Arizona, both domain names 304 and 302 share a similar location.

Domain name gnarly-trails.com 306 is also directly connected to domain name 302. In this example, domain name 306 is associated with a website that contains a database of mountain biking trails. The database contains trails for locations in both Arizona and Colorado. Because domain name 306 is also associated with the location of Colorado, domain name 306 is connected to domain name 308 and, through domain name 308, to domain name 310, where both domain names 308 and 310 are associated with biking in Colorado.

In this manner, many different graphs can be generated for the domain names that have been profiled using any combination of dimensions calculated by profile generation module 104. For example, graphs could be created to interrelate domain names associated with businesses located in the same geographical region and having similar target growth percentages. Another graph may associate businesses that ship the same types of products, regardless of the location of the business (such identifications could help connect business owners so that they can discuss best options for shipping, etc.).

Another graph could relate domain names that are associated with nascent businesses that are of the same type. A nascent business may be one for which a customer has purchased a domain name, but has not associated the domain name with a website (or only has a temporary, place-holder website) and has not yet formally formed a business. In fact, such a graph need not be limited to business-based relationships. Relationships based on mere ideas in common may suffice. For example, the graph may interrelate domain names whose registrants appear to have ideas, concepts, themes, or areas of interest in common, perhaps based on domain name or website keyword analysis. For example, where such data indicates a common theme (e.g., bikes) between domain names, the graph may map relationships between registrants of such domain names.

Still other graphs could be generated to interrelate companies that are likely in need of professional website and web-business design and engineering assistance. Such a graph may interrelate nascent businesses (e.g., by identifying and interrelating domain names that, even though they are associated with a website, have very little web traffic) based upon location. Web professionals could then use the graph to identify local domain name registrants that may benefit from improving their assistance in developing and refining an online presence.

Yet another graph may interrelate companies that are consumers of similar online services. Such a graph could be used by an individual who has just purchased a particular online service (e.g., domain name protection, SEO services, hosting services) to identify contacts at other businesses that may be of assistance in setting up those online services. In such a case, it may not be necessary to use business type as one of the dimensions that is used to interrelate the domain names in the relevant graph. Because expertise in a particular online service could be held by a contact at a completely unrelated business, interrelations between businesses that sell or market very different products or services could be useful as long as the businesses have implemented similar online services.

Figure 4:
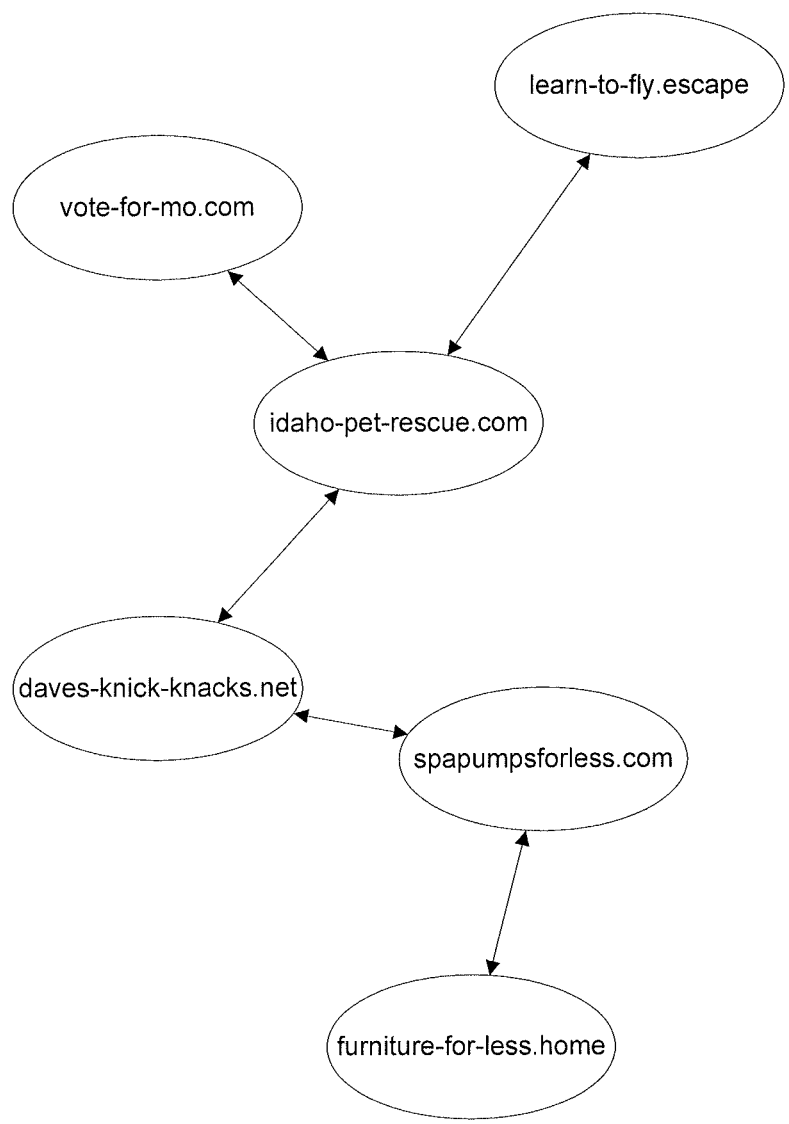
FIG. 4 is an example graph used in a possible embodiment for business strategy and market research within a social network.

To illustrate, FIG. 4 is graph that interrelates companies that have installed or setup similar online services. As shown, based upon the domain names themselves, the domain names do not appear to be associated with businesses that all sell similar goods or services. Even so, the registrant of the domain name daves-knick-knacks.net may wish to contact contacts at either idaho-pet-rescue.com or spapumpsforless.com to get assistance with setting up and configuring particular online services because, as indicated by the graph of FIG. 4, each of those domain names has installed or configured similar online services. Accordingly, contacts at either of those domain names may be able to provide good technical assistance on suggestions of the best way to setup the online services for daves-knick-knacks.net.

Once created, the various graphs could be used by suggestion engine module 108 to provide suggested contacts and recommended domain names to a user in a number of different scenarios. In one example, a forum or website could be created that allows a registrant of a domain name to identify other domain names or contacts with similar ideas, or at related businesses that may helpful to the user. For example, the contacts may help the user brainstorm how to advance their nascent idea or business, or develop a website for their domain name. FIG. 5A is a screenshot that illustrates an example user interface for such a community website.

As shown in FIG. 5A, the interface includes a number of categories of recommendations. The first category, SIMILAR IDEA, provides a listing of contacts (perhaps domain name registrants as determined from WHOIS records that have opted into the network) determined to have ideas, concepts, themes, or areas of interest in common with the user. By connecting such like-minded individuals, the embodiments described herein enable them to share ideas, brainstorm, and perhaps start an online venture around their common ideas.

Another category, SIMILAR MARKET, provides a listing of domain names that are associated with businesses in a similar market to the user. By using the listing of the domain names, the user can access the provided websites for those domain names to learn what attributes are associated with a successful website in their market. In some cases, the user may even get ideas for how to improve their own website design having reviewed the websites of a number of similar businesses.

Another category, SIMILAR ONLINE PRESENCE, provides a listing of domain names that have a similar online presence to the user. In that case, the domain names listed have purchased, setup, and/or configured a similar set of online services as the user. In the example depicted in FIG. 5A, registrants of each domain name have elected to opt-in and share their contact information to the small business forum. Using the contact information, therefore, the user may be able to reach out to an individual with experience in setting up and configuring the same online services. If the list of domain names is sorted so that domain names associated with businesses located nearby the user are presented earlier, the user may be able to selected one of those and setup an in-person meeting, facilitating knowledge transfer.

In a final category, SIMILAR HISTORY, the forum provides a listing of domain names that are associated with businesses having a similar history to that of the user's business in a category titled SIMILAR HISTORY. As such, if the user has a nascent business (e.g., has purchased a domain name, but is still to setup a website and formally form the company), the contacts provided may connect the user to other similarly-situated businesses. This would allow the user to reach out and make contact with other individuals that are starting businesses and can share strategies, stories, and techniques.

Similarly, if the user's business is very mature, and is driven by a sophisticated website platform, the contacts provided would be to other similarly-situated companies. Again, this would allow the user to reach out to other individuals that may be facing the same obstacles and difficulties and to share techniques and strategies for overcoming the same.

As shown in FIG. 5A, if the registrant for a domain name has opted into the small business forum, the registrant's contact information may be provided, facilitating a connection.

In one embodiment, the community website illustrated in FIG. 5A may provide communication and interaction tools known in the art to enable online engagement, such as instant or direct messaging, video chat, wikis, shared online storage, and the like.

Another embodiment may generate and display a visualization mapping related contacts to their geographic location. For example, a user may be presented with a world map, upon which relevant contacts are geo-appropriately displayed. Clicking on links may open windows enabling connection, communication, and engagement as described above. A selection mechanism may be provided allowing the user to toggle between contact overlays (e.g., SIMILAR IDEA, SIMILAR MARKET, SIMILAR ONLINE PRESENCE, SIMILAR HISTORY, etc.).

Figure 5B:
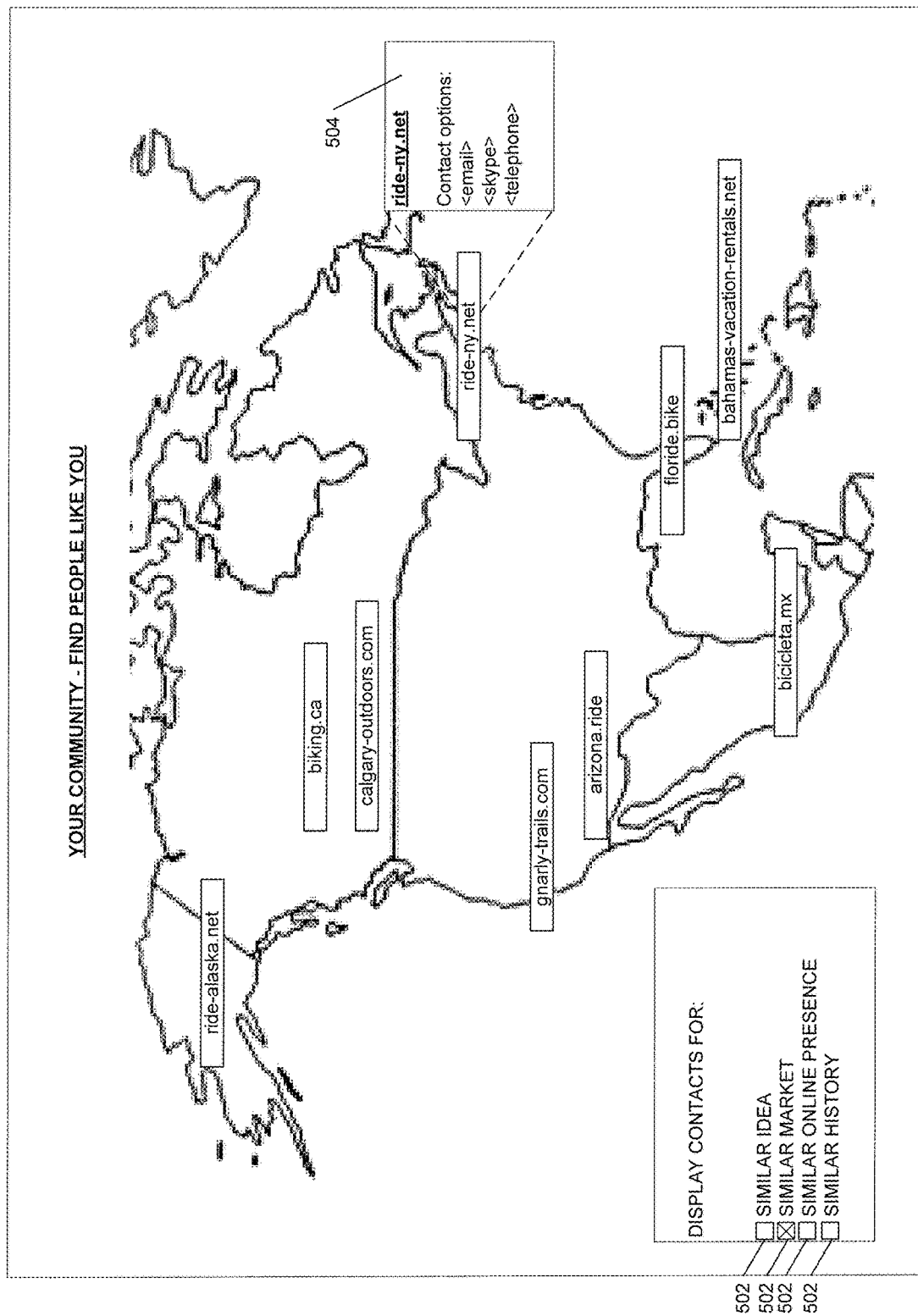
FIG. 5B is an example user interface used in a possible embodiment for business strategy and market research within a social network.

To illustrate, FIG. 5B depicts an example user interface showing how the relevant contacts may be displayed over a geographical region. With reference to FIG. 5B, the user can select, via a number of checkboxes 502, one or more categories of contacts that are to be displayed within the user interface. After the one or more categories have been selected, an appropriate geographical region is determined that encompasses the locations of all of the suggested contacts for the user in the selected categories. This may be necessary because different categories may tend to include contacts that are spread throughout different geographical regions. For example, contacts contained within the SIMILAR MARKET category may be generally restricted to the geographic area of the market. In contrast, the SIMILAR IDEAS contacts may not be restricted to a particular geographical region and may be distributed throughout the globe.

In the example depicted in FIG. 5B, the user has selected the "SIMILAR MARKET" category, and so the depicted contacts are those belonging to the user's market, which generally includes North America. If the user were to select a different set of categories for which contacts are to be displayed (e.g., by selecting or unselecting one of checkboxes 502), the appropriate geographical region would be re-calculated for the contacts contained within the selected categories and the new geographical region would be displayed in the user interface.

As shown, a number of potential contacts are depicted within the user interface at their respective locations. In this example, the user has selected the contact ride-ny.net, for example, by clicking or tapping upon the contact. In response a contact box 504 is displayed that provides the user with a number of mechanisms to get into contact with the registrant or owner associated with the selected domain name.

In other embodiments, the graphs can be utilized to provide suggested domain names and contacts as the user browses through and interacts with a domain name management website. As the user navigates through the various web pages of the website, different sets of suggested domain names or contacts could be provided that are of particular relevance to the web page currently being viewed by the user.

Figure 6:
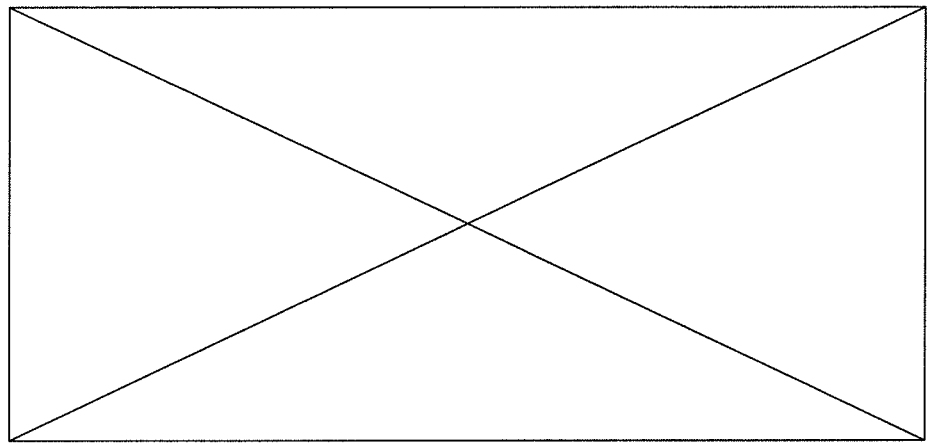
FIG. 6 is an example user interface used in a possible embodiment for business strategy and market research within a social network.

For example, FIG. 6 depicts a user interface that may be displayed while the user interacts with the domain name management website to add shopping cart functionality to their website. Within the user interface, the user is provided with a number of domain names and related contact information, where the domain name registrants of the listed domain names have themselves recently added shopping cart functionality to their own websites. By reaching out to one of the provided contacts, therefore, the user may be able to speak with an individual that has familiarity with the shopping cart functionality and that may suggest optimum ways of configuring the software for the user's business.

Although the primary dimension by which the domain names suggested in FIG. 6 are sorted is domain name recently purchased (see Table 1, above) in order to identify domain names that have recently purchased shopping cart functionality, a secondary dimension by which the domain names may be sorted is business type. In that case, the suggested domain names may include those for which shopping cart functionality has recently been purchased or added, and are associated with a similar business.

Figure 7:
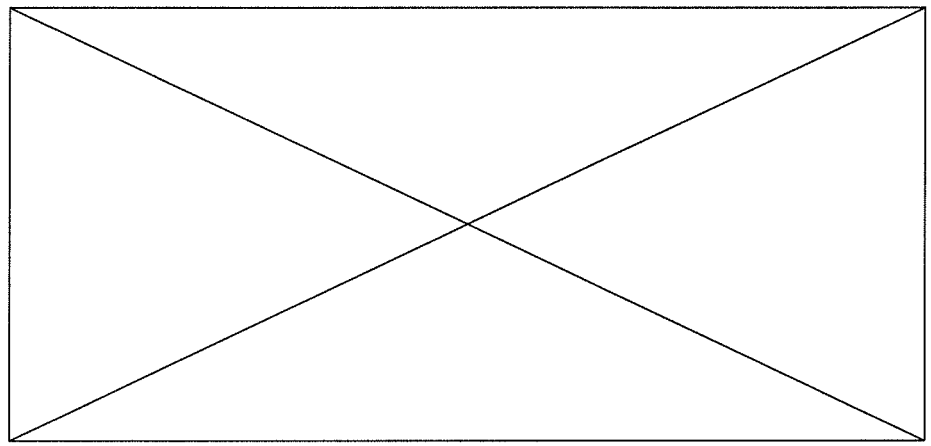
FIG. 7 is an example user interface used in a possible embodiment for business strategy and market research within a social network.

A similar set of suggested domain names and related contacts could be provided on any web page of the domain name management website. FIG. 7 shows another example user interface where domain names and contact information can be suggested as part of the SEO configuration process.

As discussed above, the various graphs may be utilized to assist web professionals (e.g., website designers and engineers, business consultants, social media managers, and the like) to identify potential new clients and, similarly, nascent business owners (or other business owners) to identify web professionals with which to collaborate.

FIG. 8, for example, shows a user interface that a web professional may utilize to identify potential new clients. As illustrated, one or more graphs that define interrelationships between domain names based on location and status of a business associated with a domain name have been analyzed to identify nascent businesses in the vicinity of a web professional. If the registrants for those domain names have opted in to the program, their contact information may be provided so that the web professional can reach out to the registrant to offer their services and assistance.

Conversely, FIG. 9 shows a user interface that may be used to assist a nascent business owner to identify a suitable web professional for assistance. In the user interface, the user is provided with a listing of domain names and contact information for web professionals that have experience working with other companies of the same business type and are local to the user.

In each of the examples shown in FIGS. 5-9, the listing of domain names (and, potentially, contact information) can be identified by analyzing one or more of the graphs generated by graph generation module 106. The suggested domain names may, for example, include those that are closest to the user's domain name in a particular graph. In some cases, the set of identified domain names can be sorted with various preferences. For example, the domain names may be sorted so that domain names associated with businesses that are local or nearby the user are presented first, with domain names associated with more distant businesses being presented later. In general, once a number of domain names are identified, they can be sorted using any further combination of dimensions, as described above. Thus, the disclosed invention may include a social network connecting users who are seeking specific business strategy feedback around recently registered domain names.

The disclosed invention may also generate a social network connecting users who are seeking specific business feedback around one or more product or service ideas. In these embodiments, the user input 200 for the disclosed system may be made up of a user profile data about the user and/or an entrepreneurial idea for a new product or service created by the user. The input data 200 may be used to request and identify related ideas for products or services stored within the social network that share characteristics with the user, the user's product or service idea, and/or products or services that the user has liked within the social network. The user or product's data profile may be generated by aggregating customer data 204, business accounting history data 208, website data 206 and/or domain name data 202 associated with the input user profile and/or product/service. Using this user or product data profile, the disclosed system may generate a graph where users and/or combinations of product ideas sharing a greater number of features are clustered together in closer proximity than those users and/or product ideas sharing a lesser number of these features. The disclosed system may then recommend relevant products to the user via a user interface, thereby providing a social network that learns, from the user actions taken, similar market segments and targeted marketing for specific products and types of products sharing similar features.

Returning to FIG. 2, the user input 200 received for data collection module 102 should not be limited to a list of domain names, as previously described, but may also include input related to any of the entities described herein whose features are defined according to data within the DNS 202, customer records database 204, web server 206, accounting history database 208, and/or any other data sources described herein. As non-limiting examples, the input 200 for data collection module 102 may receive any data related to users of the system, businesses operated by the users of the system, websites related to these businesses, products or services available through these businesses and/or websites, etc. Thus, FIG. 2 may also include variations of the data to be input and stored according to the example block diagram illustrating an example operation of data collection module 102.

Specifically, data collection module 102 may receive as an input any combination of data regarding entities such as users, businesses, websites, products, services, etc. Having received the input associated with these entities, data collection module 102, for each received input data, may access the candidate data storage systems in an attempt to gather related information and store that information in a suitable data repository in association with the appropriate entity profile, analogous to the steps described above, to be accessed and retrieved by the other components of the computer server 100.

After data collection module 102 has collected the available information, profile generation module 104 may be configured to generate a profile for each of, or any combination of, the entities for which the data was input. The profile may be configured to describe various attributes or features of each, which, in many cases, involves describing attributes or features of a user, business, product, theme, idea, concept, area of interest, or other entity that may be associated, in some way, with the input data for the entities. As above, these attributes or features may be referred to herein as dimensions. Depending upon the implementation of the present system, any number of features and/or dimensions may be defined or calculated for each of the input entities, analogous to Table 1 above.

Computer server 100 may receive and analyze these dimensions as features associated with users, businesses, websites, products, services, etc. These features then become factors in determining the strength of relationships between these entities, according to a number of common features that the entities share. As above, the values of the various features may be of varying types. Some features may be numerical values, while others may be collections of keywords of text strings. Still other feature values may include listings of values that describe particular geographical regions or an industry category associated with a user, business, website, product, service, idea, etc.

For users, non-limiting examples of features may include a customer profile for each user, which may further include demographics for the user, actions taken by the user (e.g., liking, following, and/or commenting on products with features of interest to the user, discussed below), etc. These features and dimensions may be generated and stored in association with the user profile according to data received from the data sources, as keywords within strings from a website about the business or product, for example. These keywords may then be used as factors in matching to other users and/or products.

For businesses and/or websites, non-limiting examples of features may include an industry category for the business or website (e.g., restaurant business, web development business, etc.), a business' status within the entrepreneurial process (e.g., new business, established business, multibillion dollar business), etc. In some embodiments, this industry category may be identified through keywords from the domain name, business name, website, product names or descriptions, etc., or as an explicit category defined with in the user profile, or as otherwise identified within the data sources.

For geography, non-limiting examples of features may include the geography of the user and/or business. In some embodiments, the user and/or business' geography may be identified according to: a geography defined in the user profile; an internet protocol (IP) address of a client computer operated by the user or the host of the website; business records indicating website traffic and/or product sales in a particular geographic area; languages spoken in relation to e-commerce activity for a product or service, and by extension, the primary geographical area associated with that language; etc.

After the profile generation module 104 calculates and identifies the features of the users, businesses, websites, products, services, etc., graph generation module 106 may use the dimensions to generate one or more graphs, as explained above, that interrelate the various entities on a number of different dimensions. In the present disclosure, a number of different graphs could be generated for each one of the various entities, where each graph focuses on a different dimension or combination of dimensions interrelating entities with other entities (e.g., showing relationships between a user and a product), or with like entities (e.g., showing relationships between a first product idea and a second product idea).

Users may display these details and relationships for any of the disclosed entities using any combination of software described herein. In one embodiment, users may download and install, on a client device, a software to graph connections between the features identified within user profiles and the features identified within product profiles, and may further recommend additional relevant products to users. Users may identify, using a user interface within the software, products that include the user's preferred features. The software may identify and use these features as factors to determining relevant products that share these features (and therefore have a stronger relevance connection), to display to the user for user feedback.

Once the software is installed, the client computer may receive input to access user profile data for the user. In some embodiments, the installed software may require authentication for the user, such as a username or password, to access a user profile account. In other embodiments, the user may use the software during a trial period (e.g., 24 hours) to determine whether a product presented by the user is receiving positive feedback from other users, in which case the user will need to create a user profile account. In some embodiments, the user may import data from a social networking site, possibly by accessing an API or another data stream for the social networking website. The user and/or computer server 100 may download the user information, possibly into a user profile in the customer records database 204, thereby providing the data repository with features that define the user. In these embodiments, the user may log into the user's profile account and/or the social media website account to authenticate themselves.

Figure 10A:
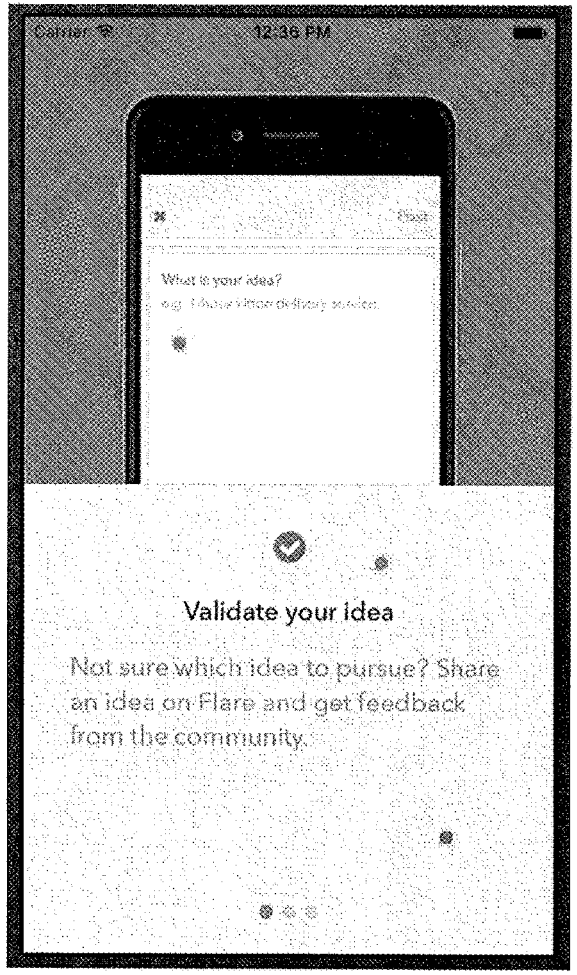
Figure 10B:
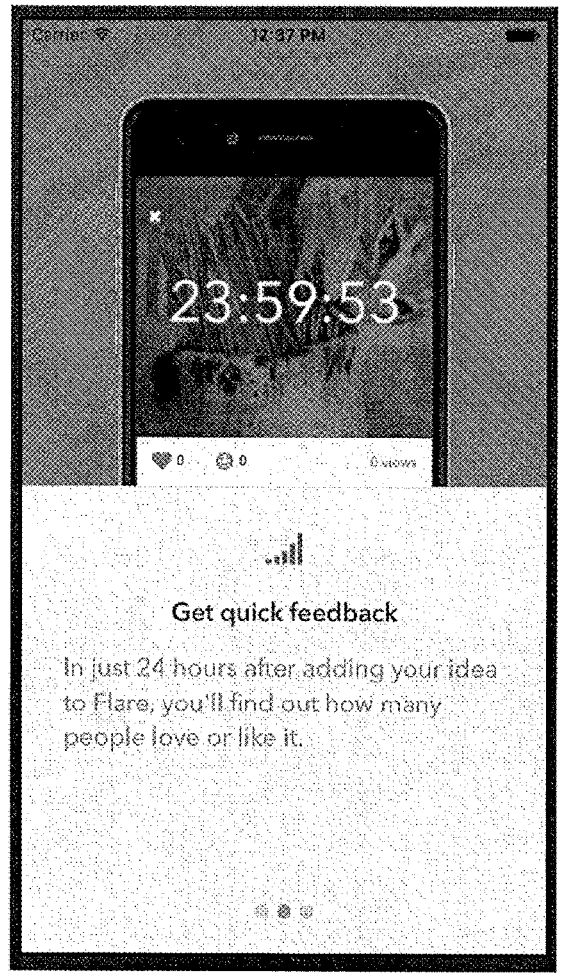

The user may then review a tutorial tour, be prompted to create a product idea, and begin the product idea input process as seen in FIGS. 10A-10C. This process may provide means for a user to post a new product idea, receive feedback from a social network community, and identify features and/or characteristics of users interested in the product idea, in order to improve target marketing for the product idea.

The installed software may include a user interface, such as that seen in FIG. 11, to define the features of the product idea. In this example embodiment, the features may include a title or headline for the product idea (e.g., "Cat grass weekly subscription"), a description of the product idea, possibly explaining why the product idea is unique (e.g., "Get a weekly delivery . . . "), and an image of the product idea, chosen by the user. As non-limiting examples, the picture may be uploaded from a user library, a camera or stock photos, such as Flickr. Additional features received from the user (not shown) may include a company name, a geographic location for the company, a name of an entrepreneur/user that posted the product idea, etc. The user may then post the product idea as seen in FIG. 12, and the product idea features data may be stored within the data repository in association with the user, possibly within a product idea profile created by the profile generation module 104.

Figure 12:
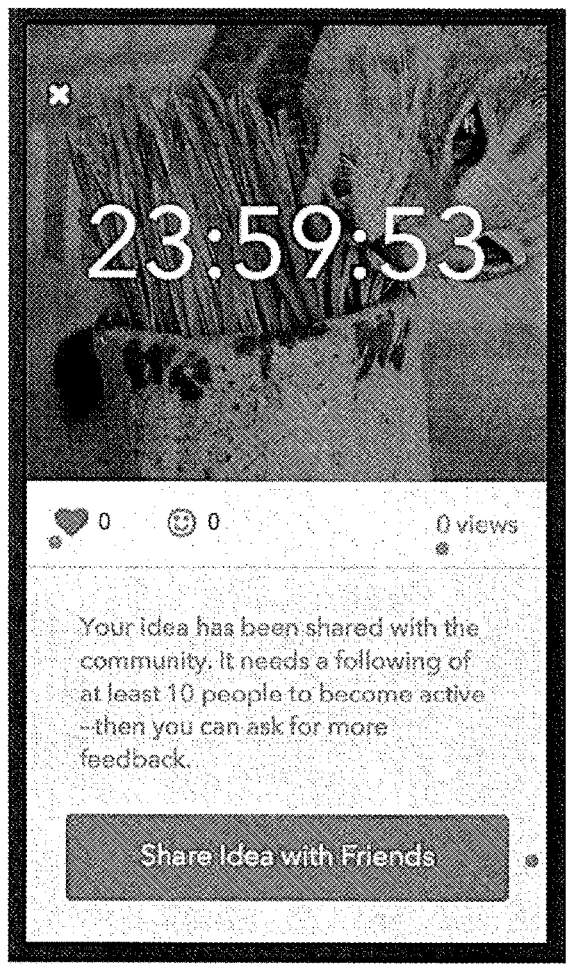
FIG. 12 is an example user interface used in a possible embodiment for business strategy and market research within a social network.

As seen in FIG. 12, the disclosed invention may include various embodiments with specific variations on the described product idea. As non-limiting examples, the product idea may be stored for a limited time (e.g. 24 hours), in which a certain number of additional users (e.g., 10), who may be following the progress of the product idea, may provide a positive response to the product idea (described as liking, loving or following herein). In this example embodiment, if the minimum required threshold of followers is not reached, the product idea may be archived, where nothing but the title is available to any other users except the creating user, who may then re-submit the idea later, if they choose. However, if the minimum required threshold is reached, the followers may become mentors, investors or customers for the user and/or the user's product. Each user of the system may access their individual accounts and create and post product ideas.

Figure 13A:
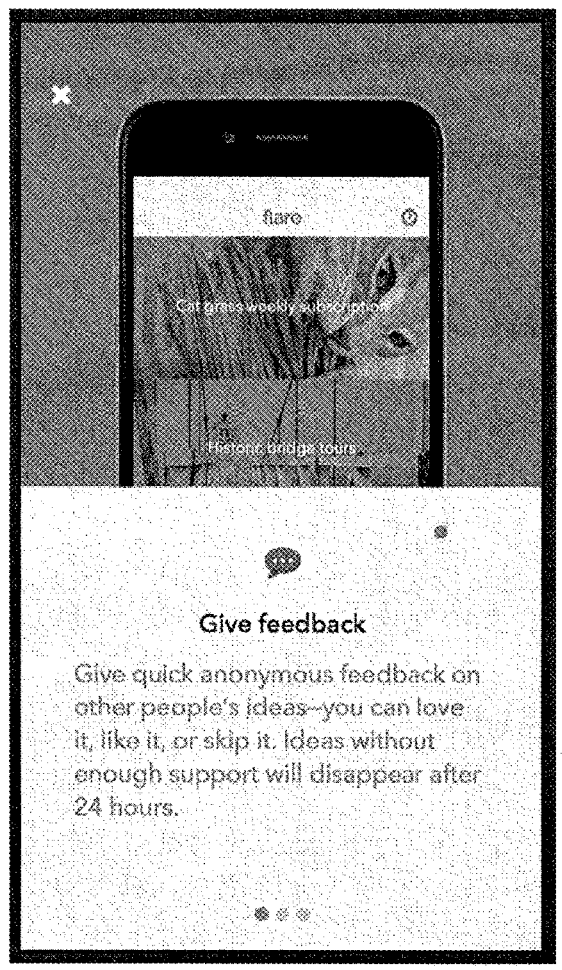
FIGS. 13A-13C are example user interfaces used in a possible embodiment for business strategy and market research within a social network.

The installed software may also include a home page for each user in order to provide feedback for product ideas posted by other users. In some embodiments, after reviewing a tutorial tour such as that seen in FIGS. 13A-13C instructing users how to give feedback on other product ideas, each user may access their home page, such as that seen in FIGS. 14A-14B, which may display product ideas from other users which are relevant to the features within the user profile and/or the features of product profiles of ideas posted by the user.

To determine the relevance of each of the product ideas in the data repository that may be displayed to the user, computer server 100 and/or suggestion engine module 108 may analyze the user profile for the user generated by profile generation module 104, using the data collected by data collection module 102 and defining the features of the user, and/or features associated with the user's business or website, such as the user's geographic location, industry category, and/or product keywords associated with any products, website content, domain name, etc. related to the user or the user's business.

Suggestion engine module 108 may then define the user or user's business, products, website, domain, etc. according to the features of these entities, and use these features as factors to identify common features between the current user (and/or product ideas submitted by the current user), and product ideas submitted by other users. Suggestion engine module 108 may analyze a product idea profile for each of the product ideas generated by profile generation module 104, using the data collected by data collection module 102 and defining the features of each product idea. These features may include the product's title/headline or description, the geographic region associated with sales of the product idea, the geographic region of the user that submitted the product idea, the geographic region of followers who have provided positive feedback for the product idea, an industry category for the product idea, product keywords associated with the product idea, a website content describing the product idea, the domain name for the website, etc.

For each product profile that shares a common factor/feature with the current user's profile (possibly including product idea profiles submitted by the user), the computer server 100, suggestion engine module 108 and/or graph generation module 106 may calculate an idea score that is unique and mutually exclusive between each product idea and the current user and/or the user's ideas. The idea score may reflect the number of common features shared between the user profile and each of the product idea profiles, where a higher score reflects a greater number of common features, and therefore a stronger connection between the user and the product idea, and a lower score indicates a lower number of common features and therefore a weaker connection between the user and the product idea. As non-limiting examples, a higher idea score may reflect a high instance of common keywords, or a common geography or industry category, between the user profile and the product idea profile. Graph generation module 106 may then generate a graph from the idea scores, where the ideas with the strongest connection are closest in proximity, within the graph, to the user.

Computer server 100 and/or suggestion engine module 108 may then render a user interface to be displayed on the home page of the installed program, with the user interface displaying one or more product ideas determined to be in closest proximity to the user within the graph and/or having the highest idea scores. In some embodiments, a plurality of product ideas may be displayed on the home page in descending order of proximity or idea score. The user interface may then be transmitted to a client device for display, as seen in FIGS. 14A-14B.

Figure 14A:
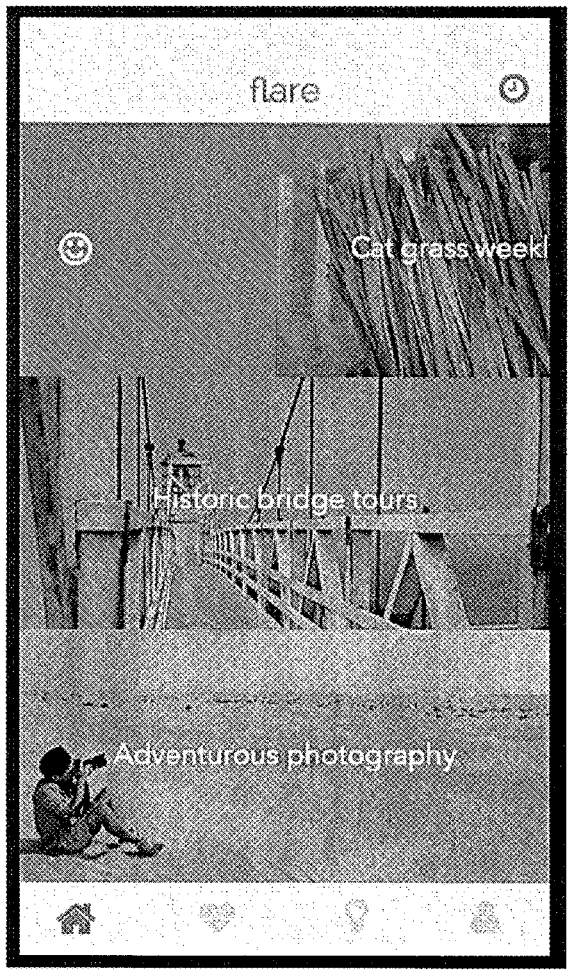
FIGS. 14A-14B are example user interfaces used in a possible embodiment for business strategy and market research within a social network.
Figure 14B:
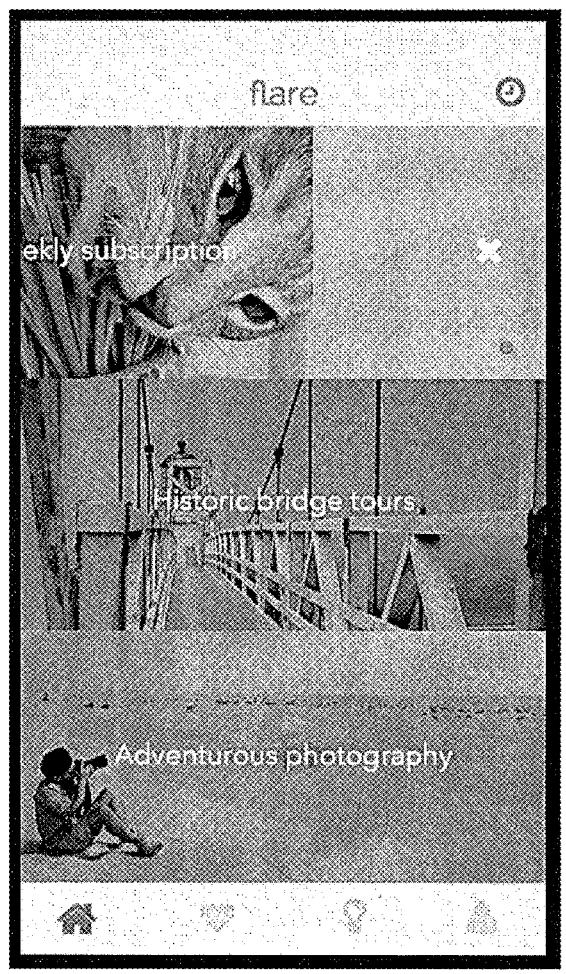

As seen in FIG. 14A-14B, the rendered and displayed home page may include one or more user interface controls allowing a user to like or skip (which may indicate neutral or negative feedback in various embodiments) each of the displayed product ideas. The user interface controls may allow a form of quick feedback allowing the user to input their level of interest in each product idea. As seen in FIGS. 14A-14B, the user interface control may include sliding the idea one direction to like the idea and the opposite direction to skip. This should in no way limit the scope of the invention. Any user interface control known in the art allowing a user to indicate positive or negative feedback may be used.

For each user feedback received, the computer server 100, suggestion engine module 108 and/or profile generation module 104 may determine whether the response feedback for each of the suggested product ideas was positive or negative. The computer server 100 may then analyze the features of each of the suggested product ideas for which the user feedback was received. For each of the product ideas receiving a positive response, the computer server 100 may assign a weight to each of the features of the product idea receiving the positive response, thereby creating a higher idea score for each of the product ideas having these features in common, and moving each of these features closer in proximity to each other and to the profile for the current user. Similarly, for each of the product ideas receiving a negative response, the computer server 100 may assign a weight to each of the features of the product idea receiving the negative response, thereby creating a lower idea score for each of the product ideas having these features in common and moving each of these features further in proximity to the profile for the current user (though closer to each other, since they share common features).

Each pair of product ideas may therefore also have an idea score that is unique and mutually exclusive between the pair of ideas. As with product ideas and users, the idea score between product ideas may be determined by the number of common features between the two product ideas, where the higher the number of common features, the higher the idea score and the closer in proximity the two ideas are within the generated graph.

Thus, in some embodiments, upon receiving feedback from a user based on the user's action (e.g., selecting one of the displayed products relevant to the user's idea or selected idea), a new idea may be displayed. To ensure relevancy to the originally displayed ideas of any new ideas displayed, and to ensure high engagement, at least one of the originally displayed and/or selected suggested products/services should have a very high relevance score, which is a function of the user's previously selected and/or followed ideas (i.e., the idea scores between these and the new idea should share a high number of common features).

Specifically, a relevance score for a new idea may be a function of the idea score for the new idea, as compared to the average idea score for the ideas previously followed by the user, which may be expressed as follows:

RelevanceScore(New)=$F$(IdeaScore(New, Followed))

In other words, the relevance score of the new idea should be a high idea score relative to the average idea score of the previously followed ideas, which may be calculated by summing the total idea scores for all ideas followed by the user, and dividing the sum by the total number of ideas followed by the user. Thus, if the user is currently following three ideas, whose idea scores are 7, 8 and 9 respectively, the average idea score for the ideas currently being followed by the user is 8. The new ideas suggested to the user should therefore also have an idea and/or relevance score of 8 or above.

Therefore, in response to the user's feedback, graph generation module 106 may then re-generate the graph, according to the weights assigned responsive to the user feedback. Those product ideas sharing a higher weighted features may be given a higher idea score and moved closer in proximity to the user profile and to each other. Those product ideas including the lower weighted features may be moved further in proximity to both the product ideas having received a positive response from the user, as well as the user profile, as the user has indicated a preference for product ideas that do not include these features.

Computer server 100 and/or suggestion engine module 108, may analyze the re-generated graph to determine one or more product ideas in closest proximity to the product ideas having received positive feedback, and that have not previously been presented to the user for feedback. The suggestion engine module 108 may then render the user interface, including at least one product idea in closest proximity to the product ideas having received positive feedback, and that have not previously been presented to the user for feedback. Computer server 100 may then transmit the user interface to the client device for display, and the process may repeat, refining the graph and suggested product ideas each time user feedback is received.

In some embodiments, the generated graph may comprise a user interface element representing the graph (e.g., a user graphic element displayed on a web page) allowing a user to see relationships between entities, and may further provide the user with specific strategic suggestions. This idea graph may comprise an idea graph (similar to the social graph shown in FIGS. 3-4), the idea graph being displayed on a user interface that displays the proximity of ideas and/or follower demographics within a graph according to at least one common specific factor and/or feature (e.g., idea concepts clustered within a geography).

Computer server 100 may render the graph for display, and may further identify and render one or more business strategy insights according to the proximity of ideas within the idea graph (which may be displayed visually). As non-limiting examples, these business strategy insights may include: determining, based on trend data, whether a business idea will likely succeed; determining whether a business idea will likely have high interest in a geography with little competition; identify followers of successful business ideas relevant to the user's idea that would be good advisors and mentors; offering visibility into different trends as a subscription service or app development, possibly in-house; idea/business generation based on ideas popular in a geographic area, and user lives in similar geography and profile suggests similar interests.

Returning now to FIGS. 14A-14B, for each product idea displayed on the user's home page, the user may select an option, such as clicking on the idea, as a non-limiting example, to display and view details about the selected product idea. In some embodiments, the user may select to display/view the details of the product idea by clicking on the icon for the product idea, or selecting a "view details" link or other user interface control. In response to the user's selection, computer server 100 and/or profile generation module 104 may render a product idea details page, displaying the title/headline, description and/or image for the product idea as stored in the product idea profile. Computer server 100 may then transmit the product idea details page to the client device for display, similar to that seen in FIGS. 13B-13C.

Figure 13B:
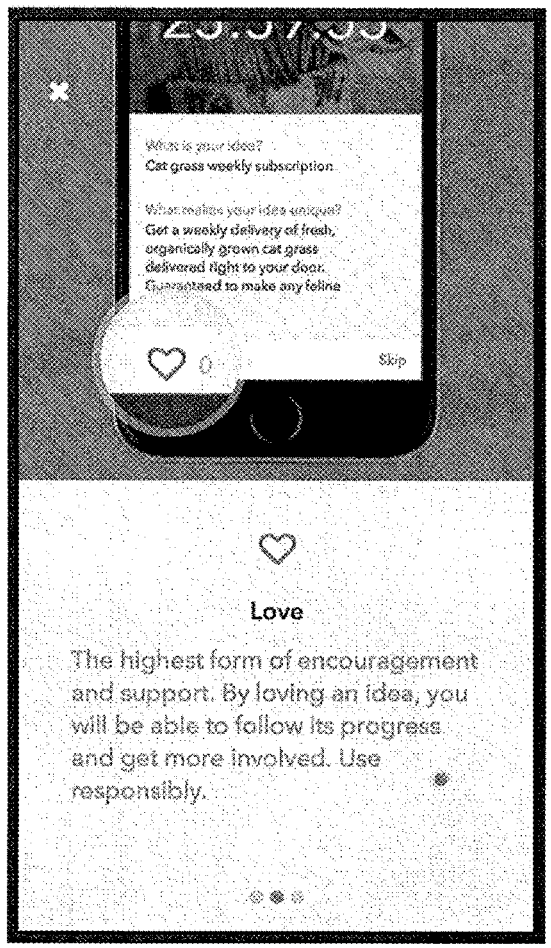
Figure 13C:
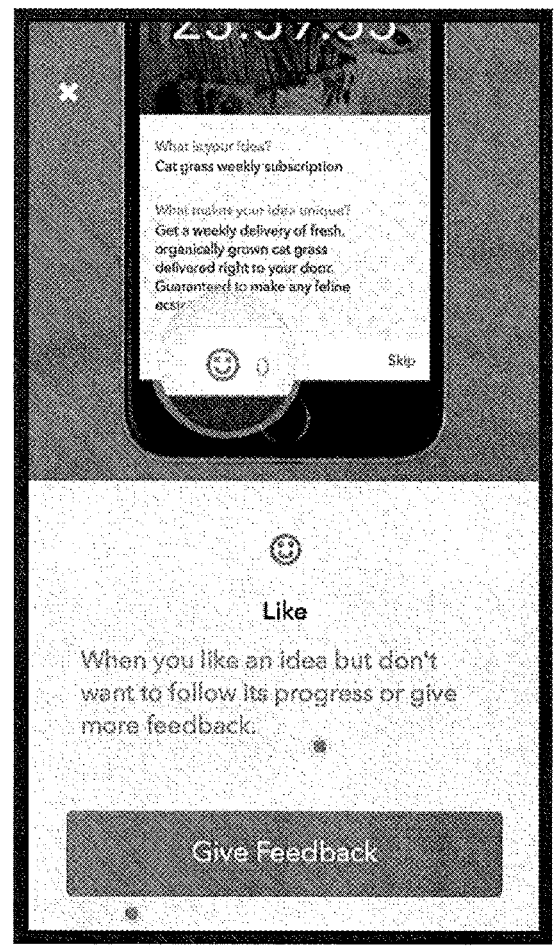

The user interface may also include an options for the user to follow the product idea, as seen in FIG. 13B. By following or "loving" a product idea, the user may follow the progress of the idea and be involved with its development. As described below, this encouragement may be in the form of answering questions created by the user that posted the product idea, and commenting on the response to the questions. In some embodiments, the encouragement may be in the form of direct messaging the user that posted product idea, and may be available from the product idea details page.

As each product idea receives new followers, computer server 100 may access the user profile generated by the profile generation module 104 for each of the product idea's followers, and may identify demographic data within the user profile for each of the followers, possibly collected and stored in the data repository by data collection module 102. Graph generation module 106 may analyze the demographic data for each of the product idea's followers to identify common demographics. Using these common demographics, graph generation module 106 may generate a graph representing the most common user demographics that are most relevant to the product idea. This graph may be used to determine product ideas receiving positive feedback from users sharing these common demographics.

As a non-limiting example, a first and a second product idea may originate from a first bakery in San Francisco, Calif., and a second bakery in San Francisco, Calif. respectively. Each of these product ideas clearly share an industry category feature and a geographic feature, and thus may be assigned a mutual idea score of 7 in this example. However, after analysis of the demographics within the user profile for each of the product ideas' followers, computer server 100 may determine that the average age of followers for the first bakery is 20, while the average age of the followers for the second bakery is 50.

A third product idea may originate from a sake bar in Oakland, Calif., where, after analysis of the demographics for the followers of the sake bar, computer server 100 determines that the average age of the followers is 20. This third product idea may generally share a relevant industry category feature and geography feature, in that the sake bar is generally in the food services industry and is in the same state as the bakeries. Graph generation module 106 may therefore generate a graph in which all three product ideas are included, but in the initial generation of the graph, the first two ideas from the bakeries may be closer in proximity than either is to the sake bar because of their shared industry category and geographic features.

However, in some embodiments, the age demographic feature may have a higher weight in determining the idea score between the sake bar product idea and the first bakery idea, for example. By considering the followers' profile data when calculating the idea score, the accuracy of the relevance between product ideas may be increased in these embodiments. Thus, because the sake bar and the first bakery both have followers whose average age, according to the user profile demographic, is 20, the mutual idea score between the sake bar and the first bakery may be 8 in this example. This means that the mutual idea score is now higher than that for the two bakeries, and the sake bar and first bakery would be closer in proximity within the generated graph.

Figure 15A:
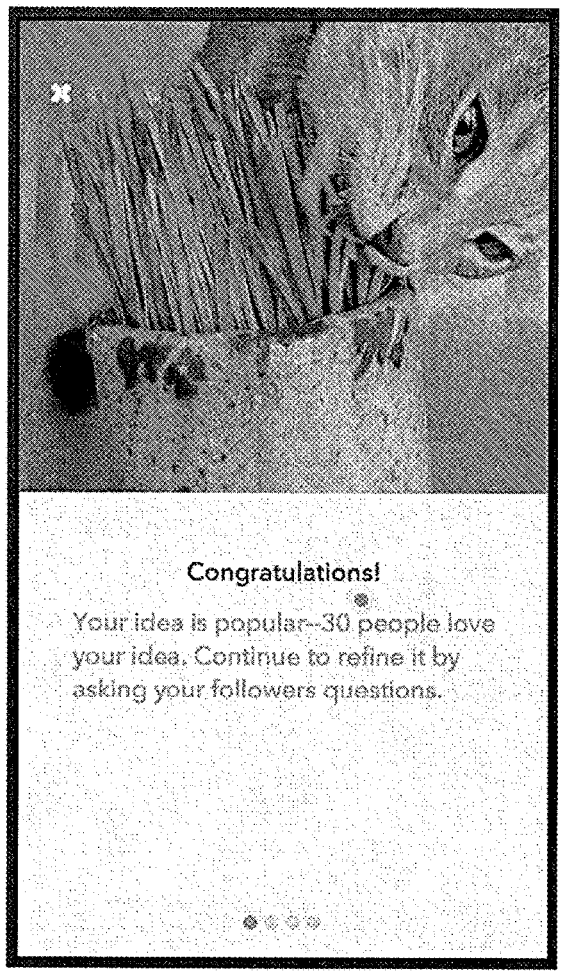
FIGS. 15A-15C are example user interfaces used in a possible embodiment for business strategy and market research within a social network.
Figure 15B:
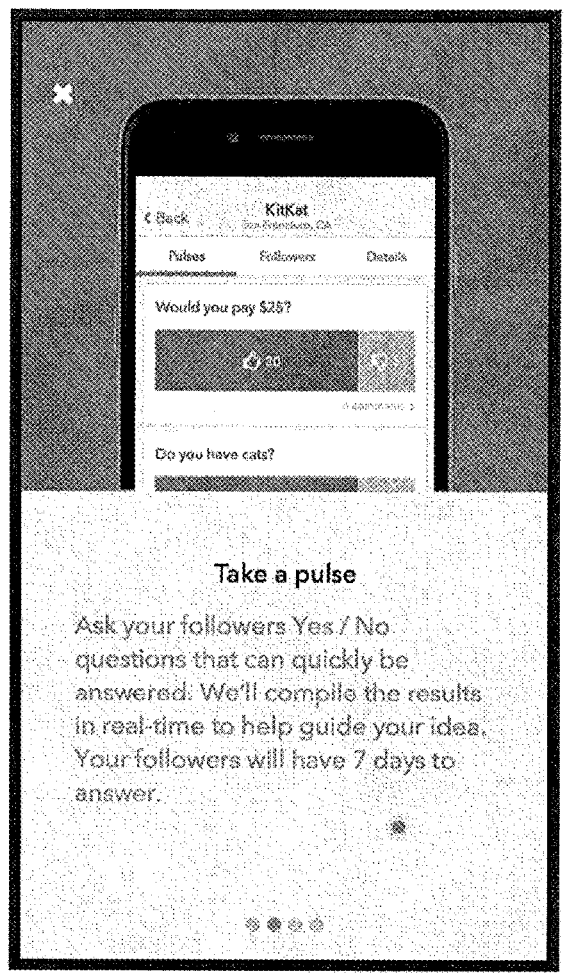
Figure 15C:
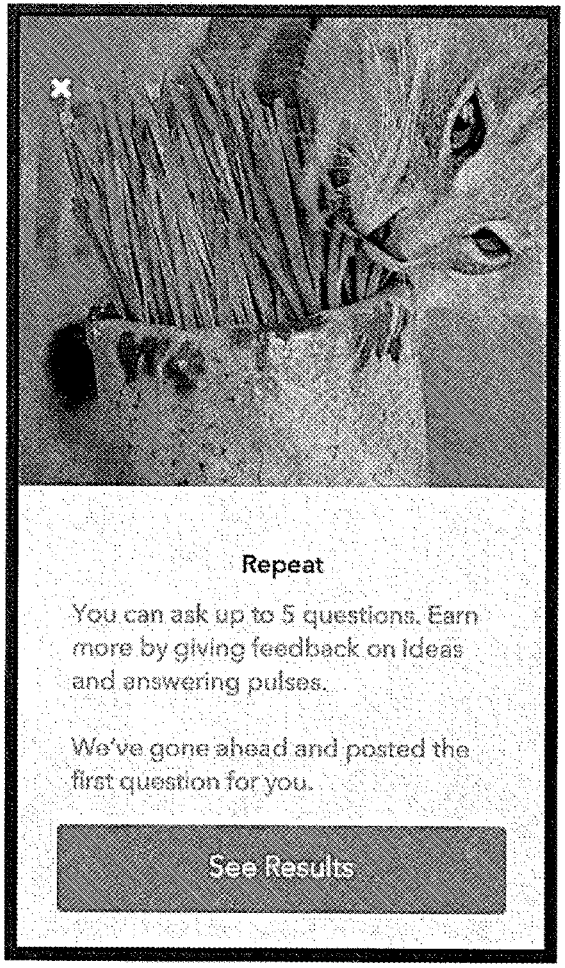

As noted above, in some embodiments, the user may create an idea, and wait a fixed period (e.g., 24 hours) to determine if the number of followers has reached a threshold amount (e.g., 10) to continue the product review process. If, at the end of the fixed period the number of followers is above the threshold amount, the user may be prompted with a tutorial tour such as that seen in FIGS. 15A-15C, instructing the user to provide yes/no questions, which followers can answer, and for which a report may be generated, displaying the compiled answers, and providing the user insights into guiding the product idea. In some embodiments, the number of questions that can be asked by a user for a product is limited to a specific number (e.g., 5 questions), and a fixed period (e.g., 24 hours) may be required between questions. However, the user may earn additional questions by giving feedback on product ideas by other users and providing responses to their questions. Followers may be given 7 days to answer questions, as a non-limiting example.

Figure 16:
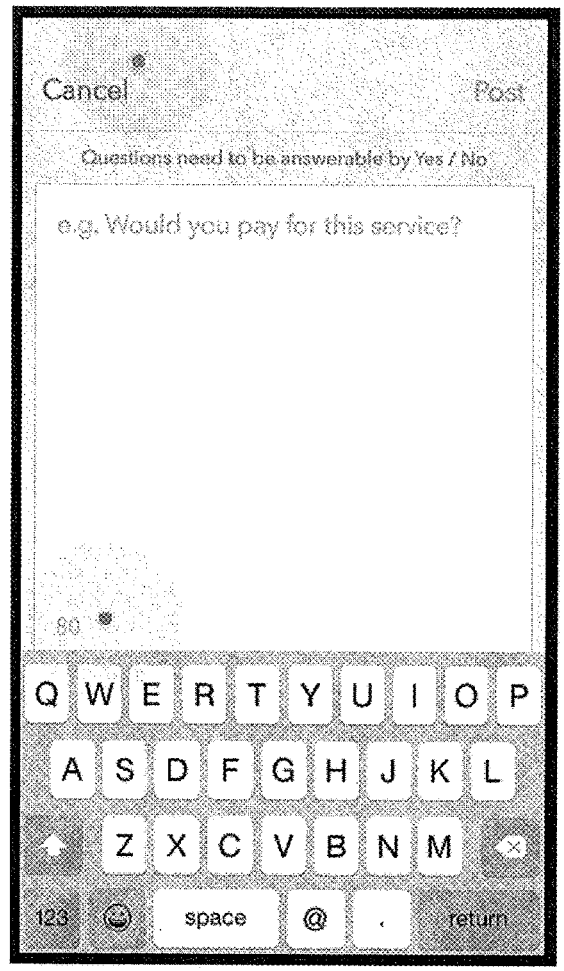
FIG. 16 is an example user interface used in a possible embodiment for business strategy and market research within a social network.
Figure 17C:
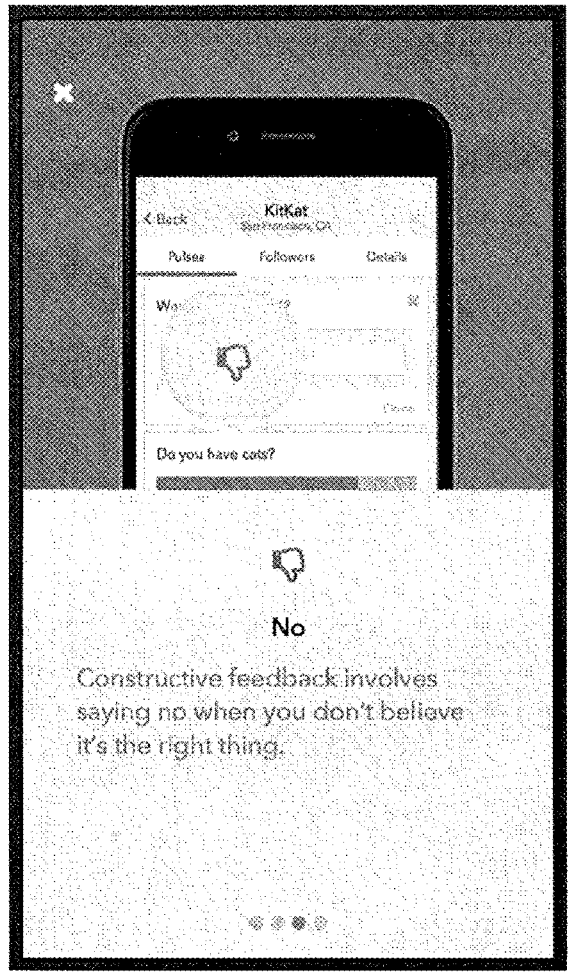
Figure 17D:
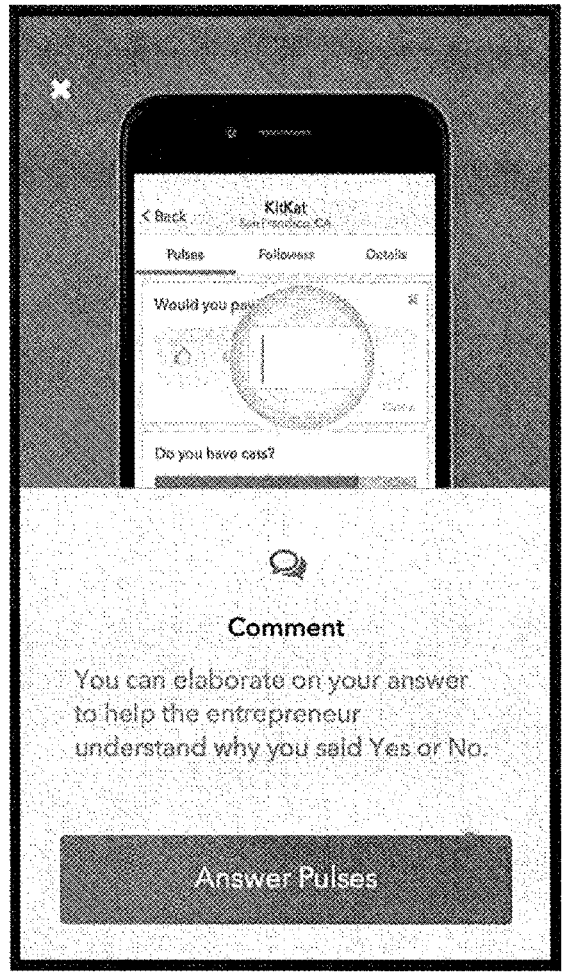
Figure 18A:
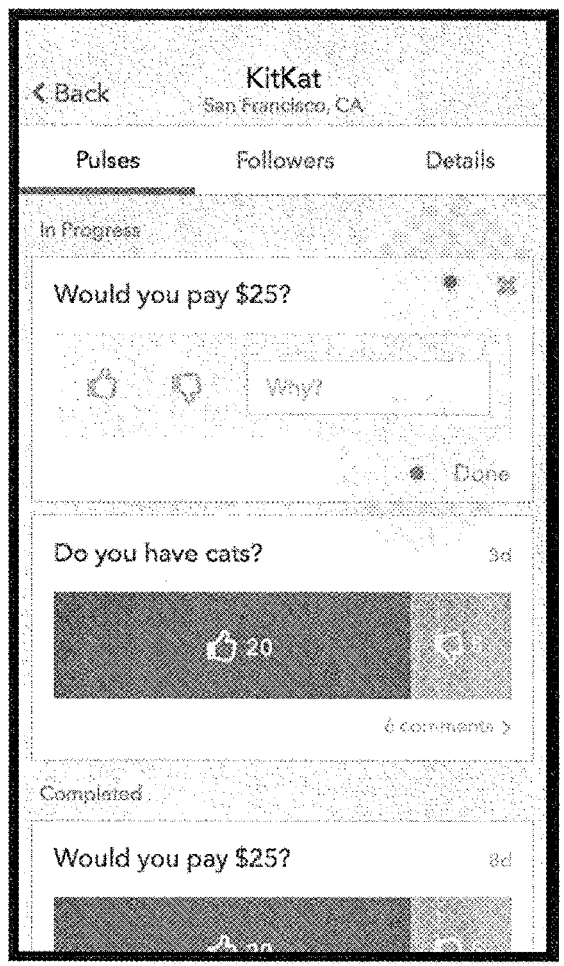
FIGS. 18A-18B are example user interfaces used in a possible embodiment for business strategy and market research within a social network.
Figure 18B:
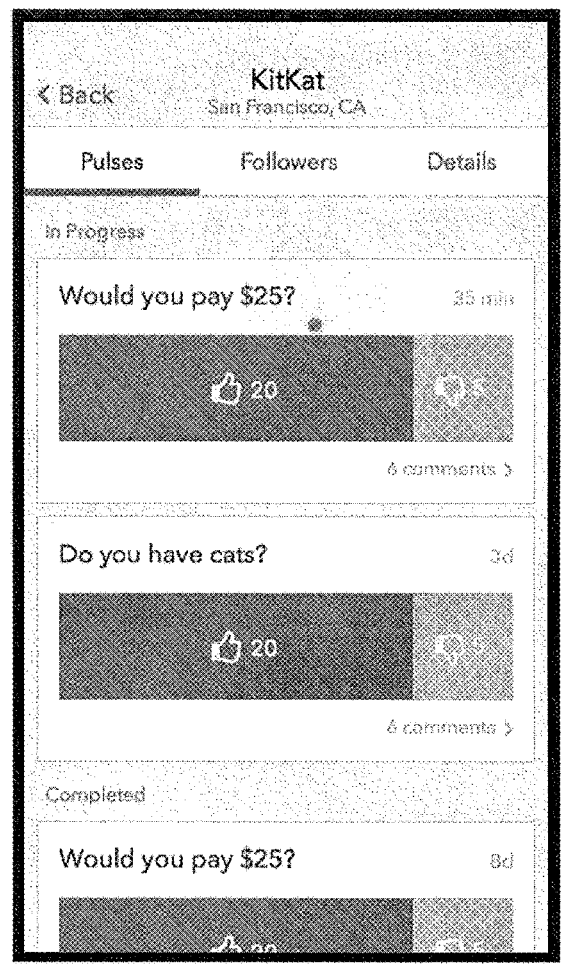

As seen in FIG. 16, a user interface may be provided for users to ask follow up questions to collect user insights and guide the product idea. As product questions are provided, and as users like specific product ideas, they may be prompted to provide additional direction and insights into the product. Computer server 100 may therefore provide a tutorial tour such as that seen in FIGS. 17A-17D, instructing the user on how to answer the questions provided for the product idea. For each product idea the user follows, computer server 100 may render, transmit and display a user interface similar to that seen in FIGS. 18A-18B, wherein the user may answer the yes/no question, provide additional feedback, and/or review the results of all followers for the question.

Figure 19:
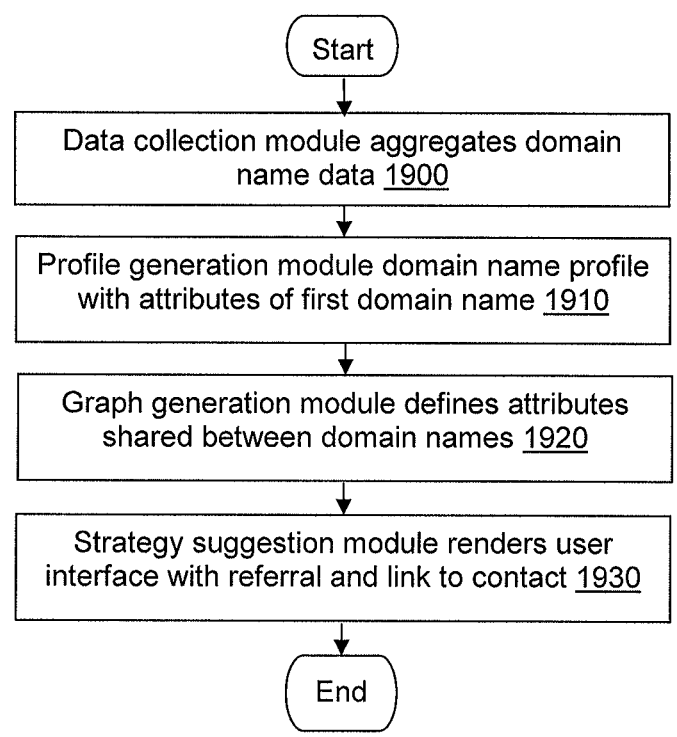
FIG. 19 is a flow diagram representing method steps within a possible embodiment for business strategy and market research within a social network.
Figure 20:
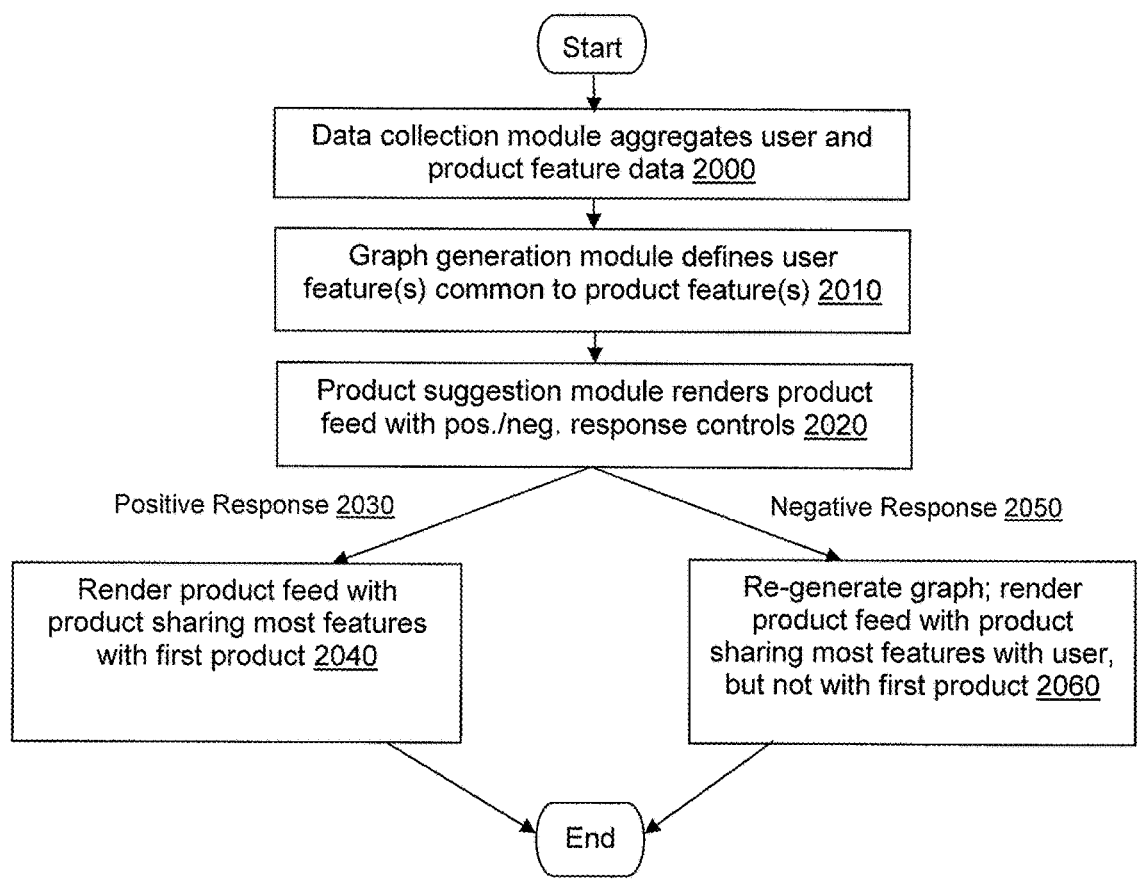
FIG. 20 is a flow diagram representing method steps within a possible embodiment for business strategy and market research within a social network.

FIGS. 19-20 are flow diagrams demonstrating the two embodiments of the disclosed invention for generating a social network for suggested business strategies and market research within a social network. In FIG. 19, at least one processor executes instructions causing a server computer, coupled to an electronic network, to run, within an active memory of the server computer: a data collection module executing at least one data query aggregating, from a plurality of data sources, a plurality of domain name data received through the electronic network (Step 1900); a profile generation module generating, from the domain name data, a domain name profile comprising a plurality of attributes associated with a first domain name (Step 1910); a graph generation module defining a plurality of domain names sharing at least one of the plurality of attributes with the domain name, wherein a second domain name, in the plurality of domain names, sharing a greatest number of the plurality of attributes with the first domain name, is closest, in proximity within a generated graph, to the first domain name (Step 1920); a domain name strategy suggestion module rendering a user interface comprising a user interface control that both identifies a referral to an administrator for the second domain name; and provides, within the user interface control, a link for contacting the administrator (Step 1930).

In FIG. 20, at least one processor executes instructions causing a server computer, coupled to an electronic network, to run, within an active memory of the server computer: a data collection module executing at least one data query aggregating, from a plurality of data sources and through the electronic network, a plurality of user profile data defining a user of a client computer coupled to the electronic network and a plurality of product profile data defining a plurality of products or services (Step 2000); a graph generation module defining at least one user feature in the plurality of user profile data common to at least one feature in the plurality of product profile data, wherein a first product in the plurality of products or services, and sharing a greatest number of features with the user profile data, is closest, in proximity, within a generated graph, to the user (Step 2010); a product suggestion module rendering a user interface comprising the first product, a first user interface control encoding a positive response to the first product, and a second user interface control encoding a negative response to the first product (Step 2020). The server computer is then configured to: transmit, via the electronic network, the user interface to the client computer; decode a transmission received via the electronic network and encoding the positive response or the negative response; and responsive to the transmission encoding the positive response (Step 2030), render the user interface comprising a second product sharing a greatest number of features and closest in proximity with the first product within the generated graph (Step 2040); responsive to the transmission encoding the negative response (Step 2050): re-generate the graph, wherein the second product sharing the greatest number of features with the user, but not with the first product, is closest in proximity, within the generated graph, to the user (Step 2060). The server computer may then render the user interface comprising the second product.

The invention is described in embodiments in the present description with reference to the Figures, in which like numbers represent the same or similar elements. Reference throughout this specification to "one embodiment," "an embodiment," "one implementation," "an implementation," or similar language means that a particular feature, structure, or characteristic described in connection with the embodiment is included in at least one embodiment of the present invention. Thus, appearances of the phrases "in one implementation," "in an implementation," and similar language throughout this specification may, but do not necessarily, all refer to the same embodiment.

The described features, structures, or characteristics of the invention may be combined in any suitable manner in one or more implementations. In the above description, numerous specific details are recited to provide a thorough understanding of implementations of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Any schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Although the present invention has been described with respect to preferred embodiment(s), any person skilled in the art will recognize that changes may be made in form and detail, and equivalents may be substituted for elements of the invention without departing from the spirit and scope of the invention. Therefore, it is intended that the invention not be limited to the particular embodiments disclosed for carrying out this invention, but will include all embodiments falling within the scope of the appended claims.

What is claimed is:

1. A system comprising:
   at least one processor configured to execute instructions causing the processor to:
   generate a domain name profile comprising a plurality of attributes associated with a first domain name;
   determine at least one graph category;
   wherein the at least one graph category comprises at least one subset of attributes of the plurality of attributes;
   generate a category-specific domain graph representing a similarity between the domain name profile and at least one additional domain name profile based at least in part on at least one shared attribute;
   wherein the at least one shared attribute is at least one attribute of the at least one subset of attributes of the plurality of attributes that is shared between the at least one additional domain name profile and the domain name profile; and
   communicate a representation of the category-specific domain graph comprising the at least one additional domain name profile to at least one computing device associated with a user based at least in part on the similarity between the domain name profile and the at least one additional domain name profile.

2. The computing system as recited in claim 1, wherein the at least one processor is further configured to execute instructions causing the processor to:
   determine an attribute value associated with each attribute of the plurality of attributes in the domain name profile;
   determine an attribute value associated with each attribute in each additional domain name profile; and
   determine the similarity between the domain name profile and each additional domain name profile based at least in part on an attribute similarity of the attribute value associated with each attribute of the plurality of attributes in the domain name profile and the attribute value associated with each attribute in each additional domain name profile.

3. The computing system as recited in claim 2, wherein the attribute value associated with each attribute of the plurality of attributes in the domain name profile comprises:
   i) at least one numerical value,
   ii) at least one keyword,
   iii) at least one text string,
   iv) at least one geographic region value, or
   v) a combination thereof.

4. The computing system as recited in claim 1, wherein the at least one processor is further configured to execute instructions causing the processor to determine a relative proximity of each respective additional domain name profile with the domain name profile based at least in part on the similarity respectively.

5. The computing system as recited in claim 1, wherein the at least one processor is further configured to execute instructions causing the processor to determine the similarity between the domain name profile and each additional domain name profile based at least in part on a weighting of each attribute of the at least one subset of attributes of the plurality attributes in the domain name profile.

6. The computing system as recited in claim 1, wherein the at least one processor is further configured to execute instructions causing the processor to:
   receive a category selection of the graph category, selected by a user at the at least one computing device.

7. The computing system as recited in claim 1, wherein the representation of the category-specific domain graph comprises an ordered list of the at least one additional domain name ordered according to the similarity between the domain name profile and each additional domain name profile.

8. The computing system as recited in claim 1, wherein the at least one processor is further configured to execute instructions causing the processor a to determine a set of additional domain name profiles of the at least one additional domain name profile having a highest similarity; and
   wherein the representation of the category-specific domain graph comprises a geographic representation of a physical proximity of each additional domain name profile of the set of additional domain name profiles to the at least one computing device.

9. A computing system comprising:
   at least one processor configured to execute instructions causing the processor to:
   generate a domain name profile comprising a plurality of attributes associated with a first domain name;
   determine at least one graph category;
   wherein each graph category of the at least one graph category comprises at least one subset of attributes of the plurality of attributes;
   generate a category-specific domain graph for each graph category representing a similarity between the domain name profile and at least one additional domain name profile based at least in part on at least one subset of attributes of the plurality of attributes;
   wherein the at least one subset of attributes is associated with the at least one graph category;
   wherein the at least one additional domain name profile comprises at least one shared attribute of the plurality of attributes shared with the domain name profile;
   wherein the category-specific domain graph represents the similarity between the domain name profile and the at least one additional domain name profile based on the at least one subset of attributes of the plurality of attributes of each additional domain name profile; and communicate a representation of the category-specific domain graph comprising the at least one additional domain name profile to at least one computing device associated with a user based at least in part on the similarity between the domain name profile and the at least one additional domain name profile.

10. The computing system as recited in claim 9, wherein the at least one processor is further configured to execute instructions causing the processor to:

determine an attribute value associated with each attribute of the at least one subset of attributes of the plurality of attributes in the domain name profile for each domain category;

determine an attribute value associated with each attribute of the at least one subset of attributes of the plurality of attributes in each additional domain name profile for each domain category; and determine the similarity between the domain name profile and each additional domain name profile based at least in part on an attribute similarity of the attribute value associated with each attribute of the at least one subset of attributes in the domain name profile and the attribute value associated with each attribute of the at least one subset of attributes in each additional domain name profile for each domain category.

11. The computing system as recited in claim 10, wherein the at least one processor is further configured to execute instructions causing the processor to:

i) at least one numerical value,
ii) at least one keyword,
iii) at least one text string,
iv) at least one geographic region value, or
v) a combination thereof.

12. The computing system as recited in claim 9, wherein the at least one processor is further configured to execute instructions causing the processor to determine a relative proximity of each respective additional domain name profile with the domain name profile based at least in part on the respective similarity for the category-specific domain graph.

13. The computing system as recited in claim 9, wherein the at least one processor is further configured to execute instructions causing the processor to determine the similarity between the domain name profile and each additional domain name profile based at least in part on a weighting of each attribute of the plurality attributes in the domain name profile.

14. The computing system as recited in claim 9, wherein the at least one processor is further configured to execute instructions causing the processor to:

receive a category selection of the at least one graph category, selected by a user at the at least one computing device.

15. The computing system as recited in claim 9, wherein the representation of category-specific domain graph comprises an ordered list of the at least one additional domain name ordered according to the similarity between the domain name profile and each additional domain name profile.

16. The computing system as recited in claim 9, wherein the at least one processor is further configured to execute instructions causing the processor to determine a set of additional domain name profiles of the at least one additional domain name profile having a highest similarity; and wherein the representation of the category-specific domain graph comprises a geographic representation of a physical proximity of each additional domain name profile of the set of additional domain name profiles to the at least one computing device.

17. A method comprising:

generating, by at least one processor, a domain name profile comprising a plurality of attributes associated with a first domain name;

determining, by the at least one processor, at least one graph category;

wherein the at least one graph category comprises at least one subset of attributes of the plurality of attributes;

generating, by the at least one processor, a category-specific domain graph representing a similarity between the domain name profile and at least one additional domain name profile based at least in part on at least one shared attribute;

wherein the at least one shared attribute is at least one attribute of the at least one subset of attributes of the plurality of attributes that is shared between the at least one additional domain name profile and the domain name profile; and communicating, by the at least one processor, a representation of the category-specific domain graph comprising the at least one additional domain name profile to at least one computing device associated with a user based at least in part on the similarity between the domain name profile and the at least one additional domain name profile.

18. The method as recited in claim 17, further comprising:

determining, by the at least one processor, an attribute value associated with each attribute of the plurality of attributes in the domain name profile;

determining, by the at least one processor, an attribute value associated with each attribute in each additional domain name profile; and determining, by the at least one processor, the similarity between the domain name profile and each additional domain name profile based at least in part on an attribute similarity of the attribute value associated with each attribute of the plurality of attributes in the domain name profile and the attribute value associated with each attribute in each additional domain name profile.

19. The method as recited in claim 18, wherein the attribute value associated with each attribute of the plurality of attributes in the domain name profile comprises:

i) at least one numerical value,
ii) at least one keyword,
iii) at least one text string,
iv) at least one geographic region value, or
v) a combination thereof.

* * * * *